US012687619B2

(12) United States Patent (10) Patent No.: US 12,687,619 B2
Ono et al. (45) Date of Patent: Jul. 21, 2026

(54) LIGHT SOURCE DEVICE, LIGHT-EMITTING UNIT, AND MEASUREMENT APPARATUS

(71) Applicant: FUJIFILM Business Innovation Corp., Tokyo (JP)

(72) Inventors: Seiji Ono, Kanagawa (JP); Takashi Kondo, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 902 days.

(21) Appl. No.: 18/073,468

(22) Filed: Dec. 1, 2022

(65) Prior Publication Data

US 2023/0258782 A1      Aug. 17, 2023

(30) Foreign Application Priority Data

Feb. 14, 2022      (JP) .................................. 2022-020767

(51) Int. Cl.
  *G01S 7/484*        (2006.01)
  *G01S 17/89*        (2020.01)
  *H05B 47/175*        (2020.01)
(52) U.S. Cl.
  CPC .............. *G01S 7/484* (2013.01); *G01S 17/89* (2013.01); *H05B 47/196* (2024.01)
(58) Field of Classification Search
  CPC ................................ G01S 17/484; G01S 17/89
  See application file for complete search history.

(56) References Cited

U.S. PATENT DOCUMENTS

| | | | | |
|---|---|---|---|---|
| 7,948,004 | B2 * | 5/2011 | Suzuki ............. | G03G 15/04072 |
| | | | | 257/116 |
| 10,451,993 | B2 * | 10/2019 | Kondo ............. | G03G 15/04054 |
| 10,809,642 | B2 * | 10/2020 | Kondo ...................... | H01S 5/42 |
| 11,961,306 | B2 * | 4/2024 | Kato ........................ | G06F 18/23 |
| 12,063,726 | B2 * | 8/2024 | Foecking ............... | H05B 45/10 |
| 12,082,512 | B2 * | 9/2024 | Winkler ................ | H10N 60/84 |
| 12,164,038 | B2 * | 12/2024 | Morita .................. | G01S 7/4873 |
| 12,200,833 | B2 * | 1/2025 | Ono ....................... | H05B 44/00 |
| 12,405,379 | B2 * | 9/2025 | Nishino ................. | G01S 17/89 |
| 2012/0001996 | A1 | 1/2012 | Nagumo | |

(Continued)

FOREIGN PATENT DOCUMENTS

| | | |
|---|---|---|
| JP | 2012011654 | 1/2012 |
| JP | 6369613 | 8/2018 |

(Continued)

OTHER PUBLICATIONS

"Search Report of Europe Counterpart Application", issued on May 8, 2023, p. 1-p. 8.

(Continued)

*Primary Examiner* — Marisa V Conlon
(74) *Attorney, Agent, or Firm* — JCIPRNET

(57)        ABSTRACT
A light source device includes: plural light-emitting sections; a setter that is electrically connected to the plural light-emitting sections and that sets, among the plural light-emitting sections, a light-emitting section to a state in which the light-emitting section is able to emit light; a first power source that supplies a first voltage to the set light-emitting section; and a second power source that supplies a second voltage to the setter, the second voltage being lower than the first voltage.

7 Claims, 12 Drawing Sheets

(56)                    References Cited

U.S. PATENT DOCUMENTS

| | | | |
|---|---|---|---|
| 2013/0214303 A1* | 8/2013 | Kinoshita | B41J 2/45 |
| | | | 257/79 |
| 2014/0320579 A1* | 10/2014 | Ohno | G03G 15/04054 |
| | | | 438/23 |
| 2018/0006645 A1* | 1/2018 | Kondo | H10F 55/18 |
| 2018/0031362 A1* | 2/2018 | Kondo | H01S 5/12 |
| 2018/0062041 A1* | 3/2018 | Nakanishi | H10H 20/824 |
| 2020/0077478 A1* | 3/2020 | Kondo | H10H 20/813 |
| 2021/0122364 A1* | 4/2021 | Lee | G06F 18/214 |
| 2021/0305773 A1* | 9/2021 | Kondo | G01S 7/484 |
| 2022/0075069 A1* | 3/2022 | Waku | G01S 7/487 |
| 2022/0163641 A1* | 5/2022 | Nagata | G01S 17/894 |
| 2023/0243934 A1* | 8/2023 | Ono | G01S 7/4815 |
| | | | 356/5.01 |
| 2023/0258782 A1* | 8/2023 | Ono | H05B 47/196 |
| | | | 356/4.01 |

FOREIGN PATENT DOCUMENTS

| | | |
|---|---|---|
| JP | 2021158160 | 10/2021 |
| WO | 2010027493 | 3/2010 |
| WO | 2019178896 | 9/2019 |

OTHER PUBLICATIONS

"Notice of Reasons for Refusal of Japan Counterpart Application", issued on Feb. 3, 2026, with English translation thereof, p. 1-p. 6.

* cited by examiner

22 — LIGHT-EMITTING SECTION

RESISTOR 74a — VLD — SETTER — 0 V — 73a

IMPROVED

22 — 74a — GROOVE M — FORM GROOVE — 0 V — 73a

GaAs SUBSTRATE

ISLAND 1    ISLAND 2

ISLAND 1

GROOVE M

COMPONENTS (RESISTORS) SUBJECTED TO VLD VOLTAGE

LIGHT SOURCE DEVICE, LIGHT-EMITTING UNIT, AND MEASUREMENT APPARATUS

CROSS-REFERENCE TO RELATED APPLICATIONS

This application is based on and claims priority under 35 USC 119 from Japanese Patent Application No. 2022-020767 filed Feb. 14, 2022.

BACKGROUND

(i) Technical Field

The present disclosure relates to a light source device, a light-emitting unit, and a measurement apparatus.

(ii) Related Art

An example of a measurement apparatus that measures the three-dimensional configuration of a subject, such as an object or a face, is disclosed in Japanese Unexamined Patent Application Publication No. 2021-158160 (paragraphs 0047 to 0080 and FIGS. 5 to 7).

The above-described publication discloses a light-emitting device (4) including multiple light-emitting diodes (LEDs) and transfer thyristors (T). The transfer thyristor (T) selects a light-emitting diode (LED) which is to emit light among the multiple light-emitting diodes (LEDs) and causes the selected light-emitting diode (LED) to emit light. A voltage is supplied from the same power source (Vgk) to drive the selected light-emitting diode (LED) and also to drive the corresponding transfer thyristor (T).

SUMMARY

Aspects of non-limiting embodiments of the present disclosure relate to a light source device, a light-emitting unit, and a measurement apparatus that can reduce power consumption, compared with the configuration in which the same voltage is supplied to a light-emitting section and a setter.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a light source device including: plural light-emitting sections; a setter that is electrically connected to the plural light-emitting sections and that sets, among the plural light-emitting sections, a light-emitting section to a state in which the light-emitting section is able to emit light; a first power source that supplies a first voltage to the set light-emitting section; and a second power source that supplies a second voltage to the setter, the second voltage being lower than the first voltage.

BRIEF DESCRIPTION OF THE DRAWINGS

An exemplary embodiment of the present disclosure will be described in detail based on the following figures, wherein:

FIG. 6 is a schematic view for explaining the arrangement of the light-emitting unit, a driver, and a setting driver on a wiring substrate;

FIG. 10 is a timing chart illustrating the operation of the light-emitting unit according to the exemplary embodiment;

DETAILED DESCRIPTION

An exemplary embodiment of the disclosure will be described below while referring to the accompanying drawings. The disclosure is not restricted to the following exemplary embodiment.

An explanation and illustration of elements other than those used for facilitating the understanding of the disclosure are omitted.

Exemplary Embodiment

The exemplary embodiment will be described below in detail with reference to the accompanying drawings.

As an example of a measurement apparatus that measures a three-dimensional configuration (hereinafter called a 3D configuration) of a subject, a measurement apparatus that measures a 3D configuration based on a time-of-flight (ToF) method using the time-of-flight of light is available. According to the ToF method, the time from when light is emitted from a light-emitting unit of a measurement apparatus until when a three-dimensional sensor (hereinafter called a 3D sensor) of the measurement apparatus receives light reflected by a subject is measured, and based on the measured time, the 3D configuration of the subject is specified. A subject whose 3D configuration is to be measured will simply be called a subject. The 3D configuration may also be called a 3D image. Measuring a 3D configuration may also be called three-dimensional measurement, 3D measurement, and 3D sensing.

The above-described type of measurement apparatus may be used for recognizing a subject from its specified 3D configuration. For example, the measurement apparatus may be installed in a mobile information processing terminal and be used for recognizing the face of a user who has accessed the mobile information processing terminal. That is, the measurement apparatus obtains the 3D configuration of the face of a user having accessed the mobile information processing terminal, determines whether the user is authorized to access the terminal, and permits the user to use the terminal only when the user is an authorized user.

This type of measurement apparatus may also be used for continuously measuring the 3D configuration of a subject, such as in augmented reality (AR). In this case, the measurement apparatus may measure the 3D configuration of a subject regardless of the distance to the subject.

The measurement apparatus may also be applicable to an information processing apparatus, such as a personal computer (PC), other than a mobile information processing terminal.

The exemplary embodiment will be described below through illustration of a mobile information processing terminal as an example of the information processing apparatus. The mobile information processing terminal authenticates a user by recognizing his/her face identified as a 3D configuration.

Information Processing Apparatus 1

Figure 1:
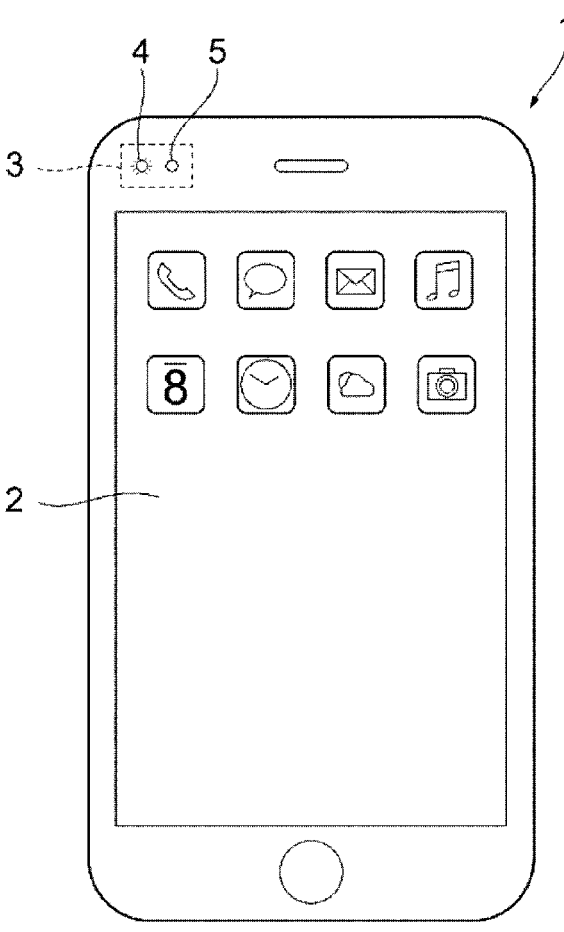
FIG. 1 illustrates an example of an information processing apparatus.

FIG. 1 illustrates an example of an information processing apparatus 1. As stated above, the information processing apparatus 1 is a mobile information processing terminal.

The information processing apparatus 1 includes a user interface (UI) 2 and an optical device 3 that measures the 3D configuration of a subject. The UI 2 is constituted by a display device and an input device integrated with each other. The display device displays information for a user, while the input device receives a user instruction concerning information processing. The display device is a liquid crystal display or an organic electroluminescence (EL) display, for example. The input device is a touch panel, for example.

The optical device 3, which is an example of a light source device, includes a light-emitting unit 4 and a 3D sensor 5. The light-emitting unit 4 emits light toward a subject, and more specifically, toward the face of a user in this example. The 3D sensor 5 receives light reflected by and returned from the face. The optical device 3 measures the 3D configuration of a face based on the ToF method and recognizes the face from the measured 3D configuration. As stated above, the optical device 3 may measure the 3D configuration of a subject other than the face. A measurement apparatus that measures the 3D configuration includes the light-emitting unit 4 and the 3D sensor 5. The 3D sensor 5 is an example of a light receiver in the exemplary embodiment. If the 3D sensor 5 is disposed on the opposite side of a driver 6 with the light-emitting unit 4 interposed therebetween, as shown in FIG. 2, the distance between the light-emitting unit 4 and the 3D sensor 5 can be determined regardless of the size of the driver 6.

The information processing apparatus 1 is a computer including a central processing unit (CPU), a read only memory (ROM), and a random access memory (RAM), for example. The ROM includes a non-volatile rewritable memory, such as a flash memory. As a result of a program and constants stored in the ROM being loaded into the RAM and the CPU executing the program, the information processing apparatus 1 starts operating and executes various information processing operations.

Figure 2:
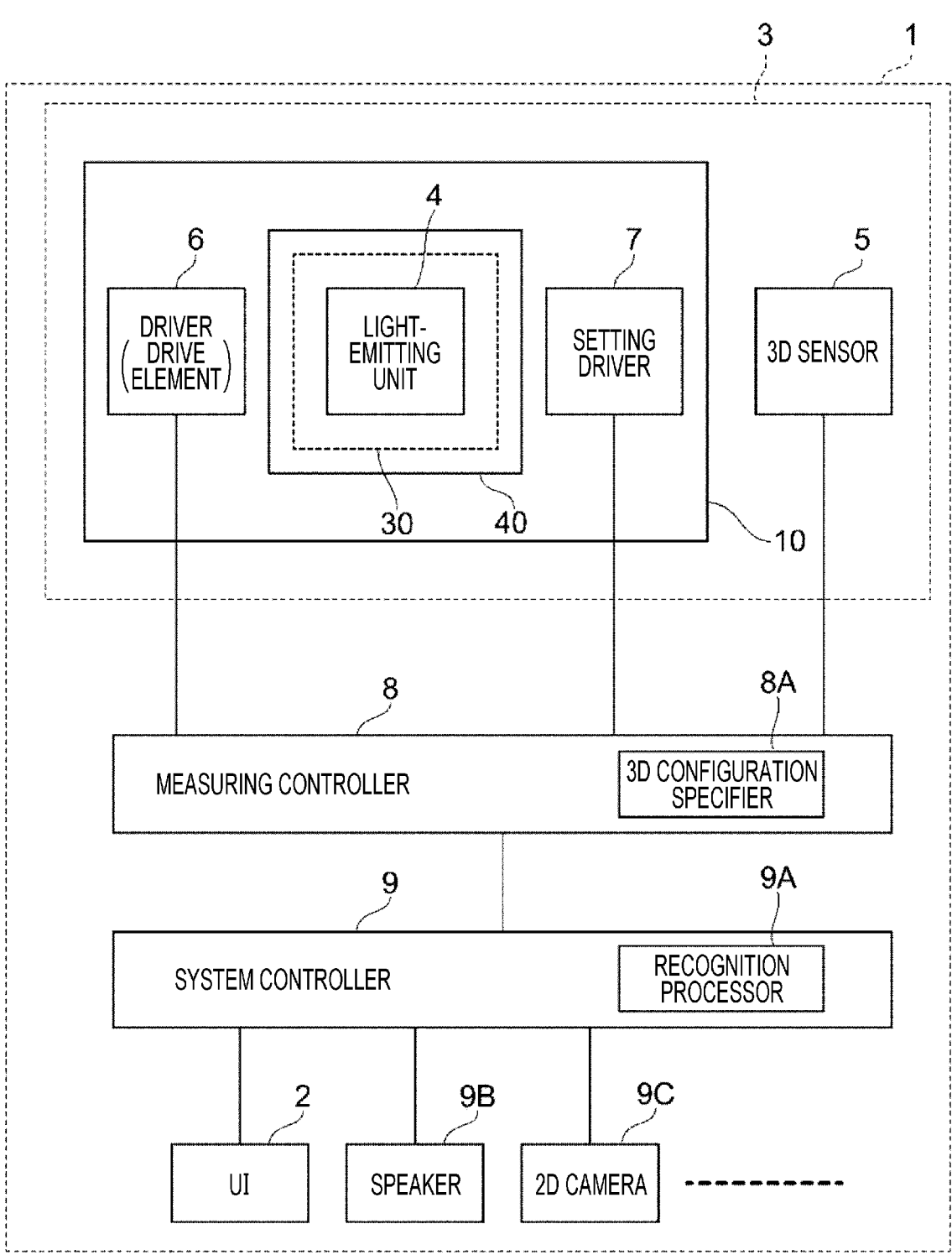
FIG. 2 is a block diagram illustrating the configuration of the information processing apparatus.

FIG. 2 is a block diagram illustrating the configuration of the information processing apparatus 1.

The information processing apparatus 1 includes the optical device 3, a measuring controller 8, and a system controller 9. The measuring controller 8 controls the optical device 3 to measure the 3D configuration. The measuring controller 8 includes a 3D configuration specifier 8A. The system controller 9 controls the entire information processing apparatus 1 as a system. The system controller 9 includes a recognition processor 9A. Devices, such as the UI 2, a speaker 9B, and a two-dimensional camera (shown as 2D camera in FIG. 2) 9C, are connected to the system controller 9. The above-described elements of the information processing apparatus 1 form the measurement apparatus of the exemplary embodiment.

The 3D configuration specifier 8A of the measuring controller 8 measures the 3D configuration of a subject from light reflected by the subject so as to specify the 3D configuration. The recognition processor 9A of the system controller 9 recognizes a subject, more specifically, the face of a user in this example, from the 3D configuration specified by the 3D configuration specifier 8A. The recognition processor 9A then determines, based on the recognized face, whether the user is authorized to access the information processing apparatus 1.

In addition to the light-emitting unit 4 and the 3D sensor 5, the optical device 3 includes a driver 6, a setting driver 7, a wiring substrate 10, a light diffusion member 30, and a holder 40. The setting driver 7 generates a drive signal to be supplied to a setter 26 (discussed later). The driver 6 supplies a light-emitting current to the light-emitting unit 4 to drive it. The setting driver 7 generates a signal to enable the light-emitting unit 4 to emit light.

The light-emitting unit 4, driver 6, setting driver 7, light diffusion member 30, and holder 40 are disposed on the wiring substrate 10. The light-emitting unit 4, driver 6, and setting deriver 7 are connected to each other via wiring laid on the wiring substrate 10.

The light diffusion member 30 is inserted into a path of light emitted from the light-emitting unit 4 and diffuses the emitted light in a desirable direction. For example, the light diffusion member 30 is supported by the holder 40 disposed on the wiring substrate 10 and covers the light-emitting unit 4. The wiring substrate 10 may include a resistor element and/or a capacitor element to operate the light-emitting unit 4, driver 6, and setting driver 7. The light-emitting unit 4 may be disposed on a heat dissipation member having a higher heat conductivity than the wiring substrate 10. The heat conductivity of FR-4, which is an insulating layer material for the wiring substrate 10, is about 0.4 W/m·K. Examples of the material for the heat dissipation member are alumina ($Al_2O_3$) having a heat conductivity of 20 to 30 W/m·K, silicon nitride ($Si_3N_4$) having a heat conductivity of about 85 W/m·K, and aluminum nitride (AlN) having a heat conductivity of 150 to 250 W/m·K. As stated above, wiring is laid on the wiring substrate 10 in this example. The wiring substrate 10 may be a substrate without wiring if it can hold the light-emitting unit 4, driver 6, and setting driver 7 and electrically connects them to each other.

Figure 3:
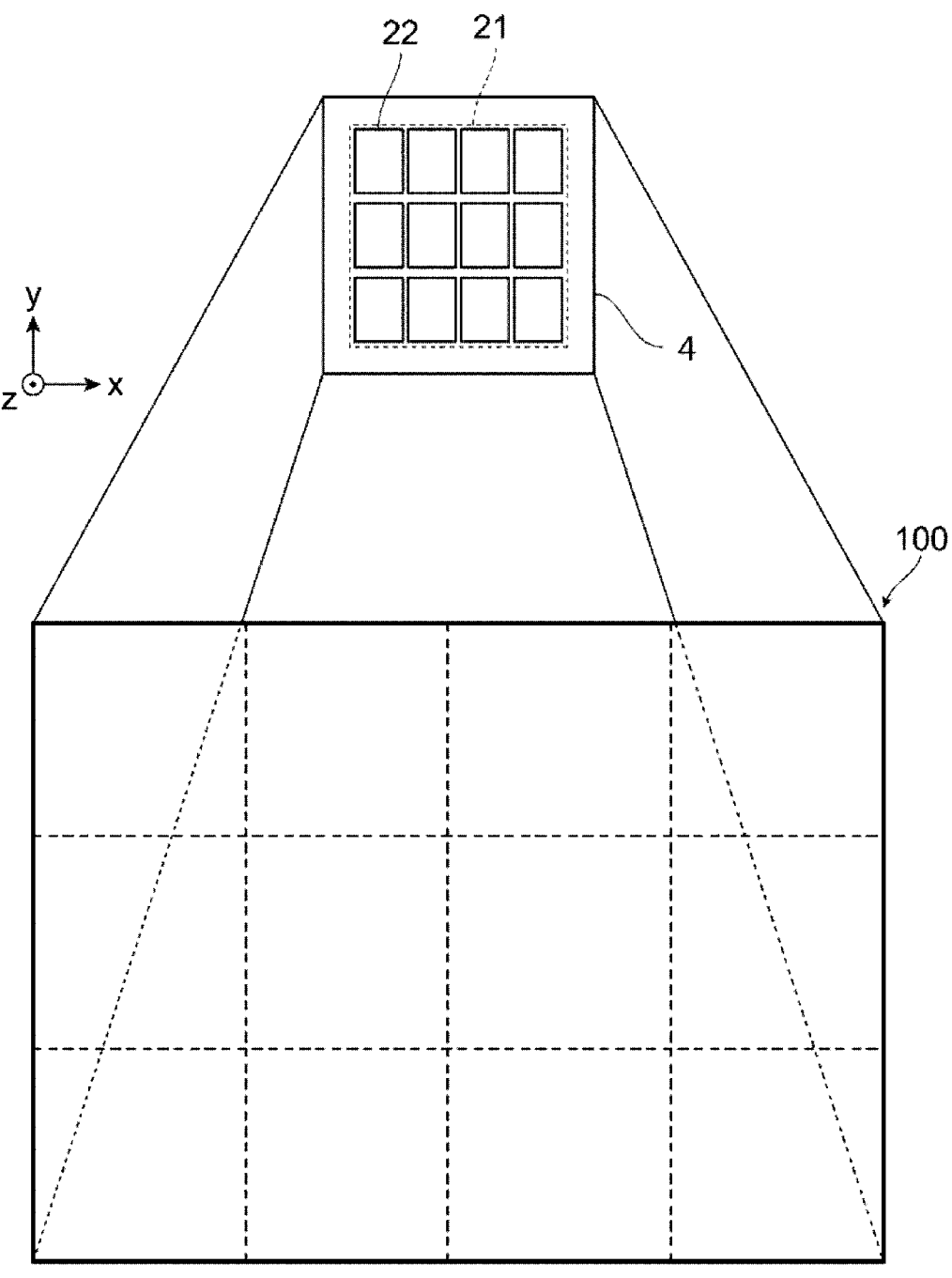
FIG. 3 is a perspective view illustrating a state in which a light-emitting unit is outputting light to an irradiation region in a distributed manner.

FIG. 3 is a perspective view illustrating a state in which the light-emitting unit 4 is outputting light to an irradiation region 100 in a distributed manner.

In FIG. 3, regarding the light-emitting unit 4, in the plane of the drawing, the rightward direction is the x direction, the upward direction is the y direction, and the direction toward the irradiation region 100 is the z direction.

The light-emitting unit 4 includes twelve light-emitting sections 22 by way of example. The twelve light-emitting sections 22 form a light output section 21. The twelve light-emitting sections 22 are arranged in a matrix form of four in the x direction and three in the y direction. The light-emitting sections 22 may emit light separately or some light-emitting sections 22 may emit light together. Alternatively, all the light-emitting sections 22 may emit light together.

The irradiation region 100 is a range of a region to be irradiated with light emitted from the light-emitting unit 4 to measure the 3D configuration of a subject. Light emitted from one light-emitting section 22 and that from another light-emitting section 22 are applied to different portions of the irradiation region 100. That is, the light-emitting unit 4 outputs light to the irradiation region 100 in a distributed manner. Light emitted from each light-emitting section 22 passes through the light diffusion member 30 (see FIG. 2) so that the irradiation direction and/or the diffusion angle of light can be set. Instead of the light diffusion member 30, an optical member, such as a diffractive optical element (DOE), which outputs light by changing the incident direction, or a transparent member, such as a condenser lens, a microlens, or a protection cover, may be used.

Figure 4:
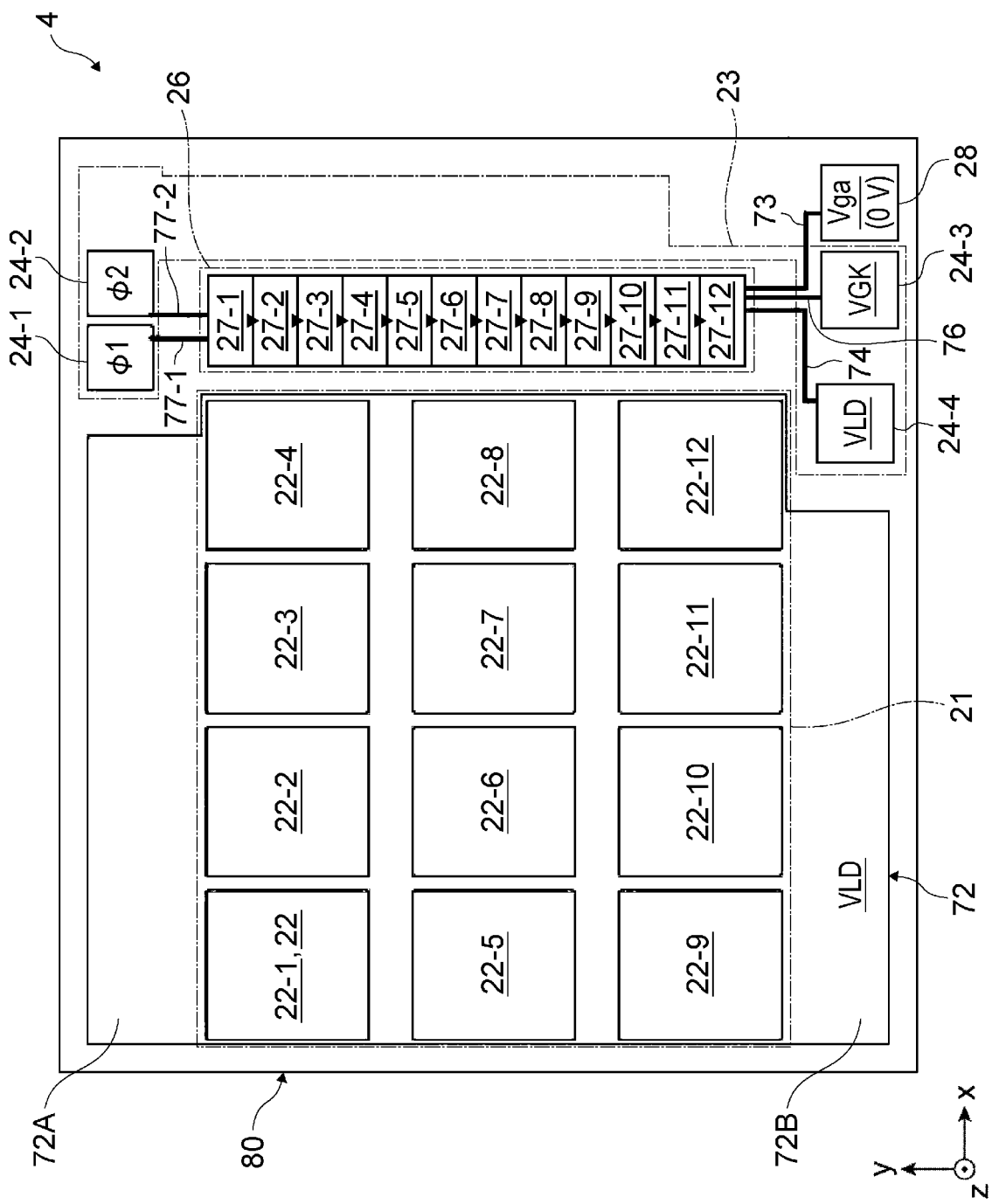
FIG. 4 illustrates the layout of a light-emitting unit according to the exemplary embodiment.

FIG. 4 illustrates the layout of the light-emitting unit 4 according to the exemplary embodiment. The x direction, the y direction, and the z direction in FIG. 4 are similar to those in FIG. 3.

The light-emitting unit 4 includes a substrate 80, a light output section 21, a terminal set 23, a setter 26, a reference voltage terminal 28, a light-emitting electrode 72, and a setter voltage terminal 24-3. The light output section 21 includes twelve light-emitting sections 22. The terminal set 23 includes signal terminals 24-1 and 24-2 that respectively receive setting signals φ1 and φ2 from the setting driver 7. The setting signals φ1 and φ2 each specifies a light-emitting section 22 which is to be set in a state in which it can emit light. The setter 26 sets the light-emitting section 22 specified by the setting signal φ1 or φ2 to a state in which it can emit light. The light-emitting section 22 set in this state is turned ON in accordance with a light-emitting signal applied to the light-emitting electrode 72. The setter voltage terminal 24-3 is an example of a second terminal in the embodiment.

On the substrate 80, the light output section 21, terminal set 23, setter 26, and reference voltage terminal 28 are disposed.

On the light output section 21 (in the z direction), the light-emitting electrode 72, which is an example of a first terminal, is disposed for all the light-emitting sections 22. In the ±y direction of the light-emitting electrode 72, pads 72A and 72B are disposed, and wiring for supplying a light-emitting current is connected to the pads 72A and 72B. That is, the pads 72A and 72B are also an example of the first terminal in the exemplary embodiment. Wiring extending from a light-emitting power source P1 (see FIG. 7) to supply a power supply voltage VLD is connected to the pads 72A and 72B. The power supply voltage VLD supplies a light-emitting current. The light-emitting power source P1 is an example of a first power source. The power supply voltage VLD is an example of a first voltage. Only the peripheral portion of the light-emitting electrode 72 is illustrated to show the light-emitting sections 22 under the light-emitting electrode 72.

The setter 26 includes shift circuits 27-1 through 27-12 that enable the corresponding light-emitting sections 22 to emit light. Hereinafter, the shift circuits 27-1 through 27-12 may collectively be called the shift circuit 27 unless it is necessary to distinguish them from each other. The setting signals φ1 and φ2 are two-phase signals. Every time the setting signals φ1 and φ2 are switched therebetween, the shift circuits 27-1 through 27-12 are sequentially selected and a corresponding one of the light-emitting sections 22-1 through 22-12 is set in a state in which it can emit light.

A reference voltage is supplied to the reference voltage terminal 28. In the exemplary embodiment, it is assumed that the reference voltage is a ground voltage GND and is called a reference voltage Vga (0 V).

On the left side of the reference voltage terminal 28 (in the −x direction), the setter voltage terminal 24-3, which is an example of the second terminal, is disposed. Wiring extending from a power source P2 (see FIG. 7), which is an example of a second power source, to supply a setter voltage VGK to set a light-emitting section 22 to emit light, is connected to the setter voltage terminal 24-3. The setter voltage VGK is supplied to the setter 26. The setter voltage VGK is an example of a second voltage. In the exemplary embodiment, a fixed voltage of 5 V is used as the setter voltage VGK.

The light-emitting electrode 72 is connected to the light-emitting power source P1 and receives the power supply voltage VLD.

Figure 5:
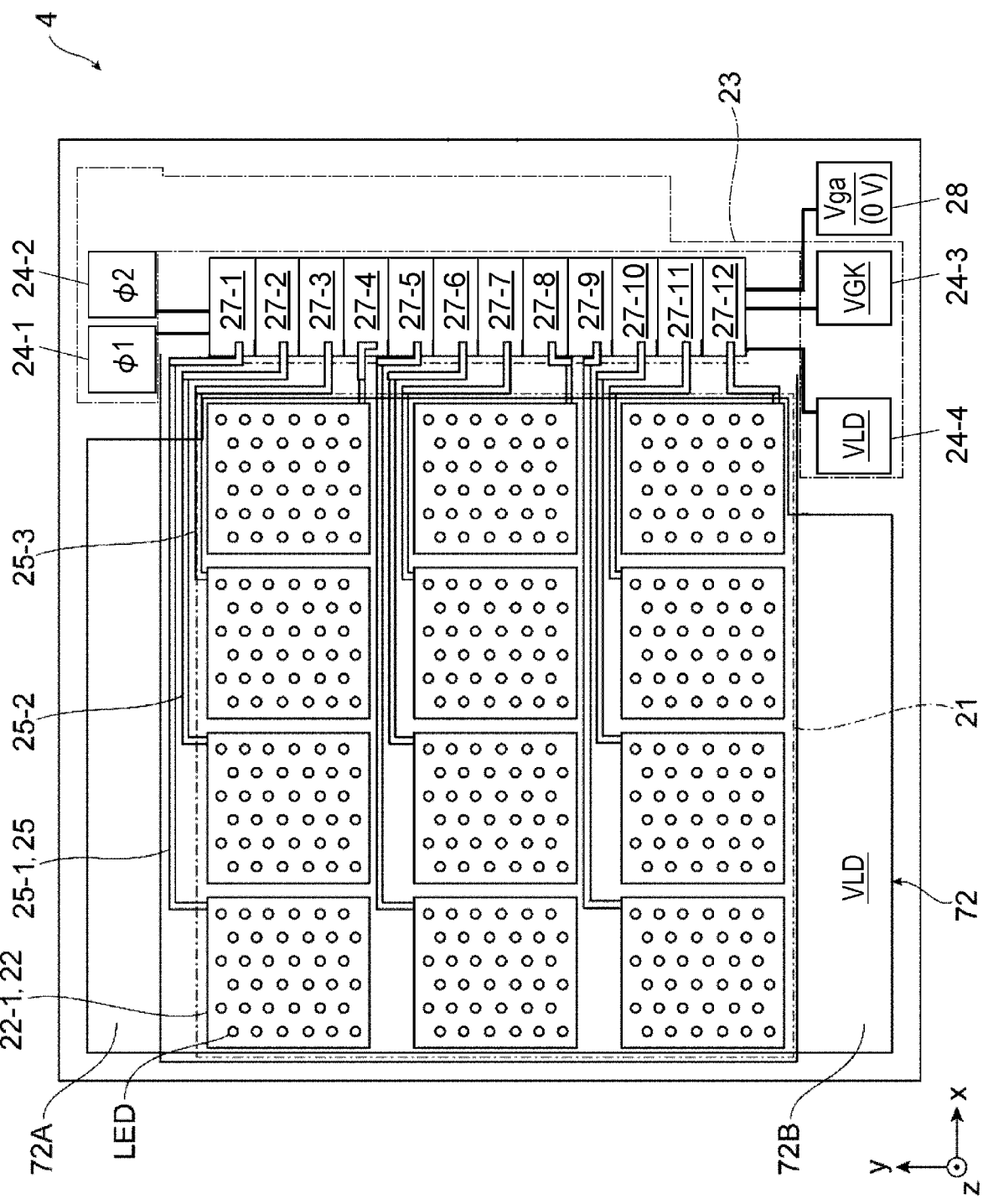
FIG. 5 is a plan view of the light-emitting unit according to the exemplary embodiment.

FIG. 5 is a plan view of the light-emitting unit 4 according to the exemplary embodiment. The x direction, the y direction, and the z direction in FIG. 5 are similar to those in FIG. 4. FIG. 5 illustrates the light-emitting unit 4 shown in FIG. 4 in greater detail. In FIG. 5, some elements are not designated by reference numerals.

The circle marks shown in the light-emitting section 22 in FIG. 5 indicate light-emitting elements. That is, each light-emitting section 22 includes multiple light-emitting elements. The individual light-emitting sections 22 may include the same number of light-emitting elements or different numbers of light-emitting elements. Alternatively, the light-emitting section 22 may include only one light-emitting element.

The individual light-emitting sections 22-1 through 22-22 of the light output section 21 and the shift circuits 27-1 through 27-12 are respectively connected to each other by lines 25-1 through 25-12, respectively. In FIG. 5, the line 25-1 connecting the first light-emitting section 22-1 and the shift circuit 27-1, the line 25-2 connecting the second light-emitting section 22-2 and the shift circuit 27-2, and the line 25-3 connecting the third light-emitting section 22-3 and the shift circuit 27-3 are shown, and the other lines 25-4 through 25-12 are not illustrated. Hereinafter, the light-emitting sections 22-1 through 22-12 may collectively be called the light-emitting section 22 unless it is necessary to distinguish them from each other. Hereinafter, the lines 25-1 through 25-12 may collectively be called the line 25 unless it is necessary to distinguish them from each other.

The line 25 is disposed outside and along the light-emitting section 22. This implements a higher density of light-emitting diodes LEDs, compared with when lines are laid on the surfaces of the light-emitting sections 22.

The shift circuits 27-1 through 27-12 of the setter 26 are each connected to one of the signal terminals 24-1 and 24-2 and to the setter voltage terminal 24-3, and a power supply voltage terminal 24-4, which is discussed below. Hereinafter, the signal terminals 24-1 and 24-2, the setter voltage terminal 24-3, and the power supply voltage terminal 24-4 may collectively be called the terminals 24 unless it is necessary to distinguish them from each other.

In the setter 26, first and second signal lines 77-1 and 77-2 for respectively sending the setting signals φ1 and φ2, a reference voltage line 73 for supplying a reference voltage, a power supply voltage line 74 for supplying the power supply voltage VLD, and a setter voltage line 76 for supplying the setter voltage VGK are disposed. The reference voltage line 73 is connected to the reference voltage terminal 28. The power supply voltage line 74 is connected to the power supply voltage terminal 24-4, which is an example of a third terminal. As discussed above, the power supply voltage VLD is supplied to the light-emitting electrode 72, and in the exemplary embodiment, the power supply voltage VLD is also supplied to the power supply voltage line 74. The setter voltage line 76 is connected to the setter voltage terminal 24-3. On the back side of the substrate 80, a back-side electrode 79 (see FIG. 9B), which is used as a driver signal terminal, is disposed.

The light-emitting section 22 of the light output section 21 is connected to the shift circuit 27 of the setter 26. The shift circuit 27 is connected to the terminals 24 of the terminal set 23. The setting signals φ1 and φ2 received by the signal terminals 24-1 and 24-2 enable the light-emitting section 22 to emit light via the shift circuit 27.

Figure 6:
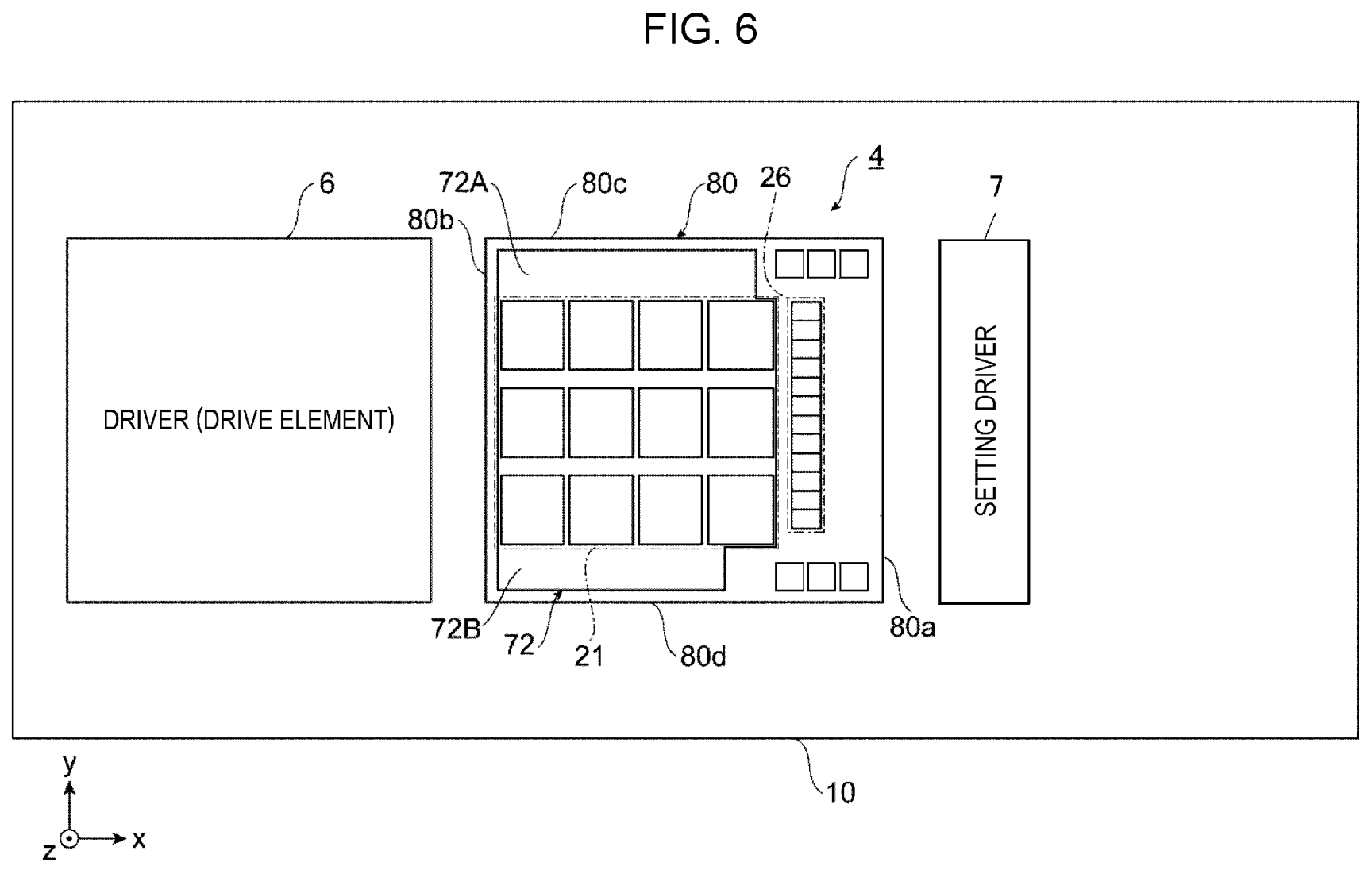

FIG. 6 is a schematic view for explaining the arrangement of the light-emitting unit 4, the driver 6, and the setting driver 7 on the wiring substrate 10. The light-emitting unit 4 shown in FIG. 6 is a simplified form of the light-emitting unit 4 shown in FIG. 4.

The driver 6 is disposed close to a side surface 80b (−x direction) of the substrate 80 of the light-emitting unit 4. The setting driver 7 is disposed close to a side surface 80a (+x direction) of the substrate 80 of the light-emitting unit 4. That is, the driver 6 is located close to the light output section 21 of the light-emitting unit 4. This makes the distance between the driver 6 and the light-emitting section 22 smaller. The inductance between the driver 6 and the light-emitting section 22 is thus decreased to quicken the rise time of a light pulse.

The setting driver 7 is located close to the terminal set 23 of the light-emitting unit 4. This makes the distance between the setting driver 7 and the terminal set 23 smaller, thereby making it easy to connect them to each other. The setting driver 7 is smaller than the driver 6. Since the setting driver 7 is located between the light-emitting unit 4 and the 3D sensor 5, the distance therebetween becomes smaller than when the driver 6 is disposed between the light-emitting unit 4 and the 3D sensor 5.

The pad 72A of the light-emitting electrode 72 is disposed close to a side surface 80c (+y direction) of the substrate 80, while the pad 72B of the light-emitting electrode 72 is disposed close to a side surface 80d (−y direction) of the substrate 80. Wiring for supplying the power supply voltage VLD to the pads 72A and 72B is not laid on the side surfaces 80a and 80b close to the driver 6 and the setting driver 7. If the pads 72A and 72B are disposed on the side surface 80a on which the terminal set 23 is provided or on the side surface 80b close to the driver 6, the terminal set 23 or the driver 6 may interfere with the connecting of the wiring to the pads 72A and 72B. The wiring for supplying the power supply voltage VLD to the pads 72A and 72B can thus be disposed without interference of the driver 6 and the setting driver 7. This makes it easy to connect the wiring to the pads 72A and 72B, compared with when the pads 72A and 72B are disposed near the terminal set 23 or the driver 6.

The pad 72A is disposed on the side surface 80c, while pad 72B is disposed on the side surface 80d. That is, the pads 72A and 72B are provided on the two opposing side surfaces of the substrate 80. Alternatively, only one of the pads 72A and 72B may be disposed on one side of the substrate 80. By providing the pads 72A and 72B on the two side surfaces of the substrate 80, a light-emitting current is supplied from both sides of the light-emitting electrode 72. This can supply a light-emitting current to the light-emitting section 22 more evenly than when only one of the pads 72A and 72B is provided.

Figure 7:
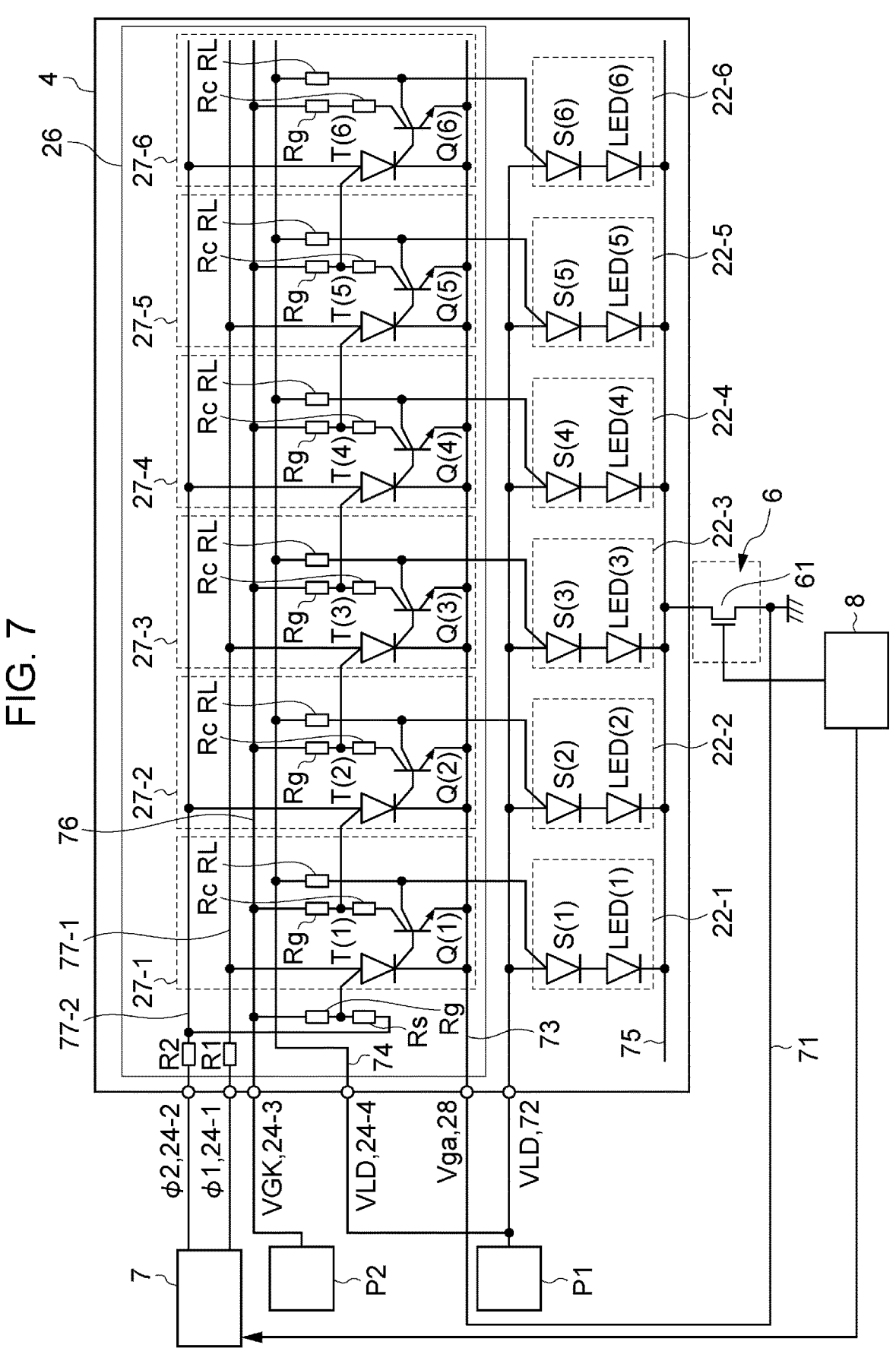
FIG. 7 is an equivalent circuit diagram of the light-emitting unit according to the exemplary embodiment.

FIG. 7 is an equivalent circuit diagram of the light-emitting unit 4 according to the exemplary embodiment.

In FIG. 7, the driver 6, the setting driver 7, and the measurement controller 8 are shown as well as the light-emitting unit 4. In FIG. 7, the rightward direction in the plane of the drawing is set to be a +x direction. In FIG. 7, thyristors and transistors are represented by symbols, and resistors are indicated by rectangles. Other drawings are also expressed in a similar manner.

The light-emitting unit 4 includes a light output section 21, a terminal set 23, and a setter 26. In FIG. 7, six light-emitting sections 22 (light-emitting sections 22-1 through 22-6) f the light output section 21, six shift circuits 27 (shift circuits 27-1 through 27-6) connected to the six light-emitting sections 22, four terminals 24 connected to the six shift circuits 27, a light-emitting electrode 72, and a reference voltage terminal 28 are shown.

Each light-emitting section 22, such as the light-emitting section 22-1, includes one or plural light-emitting diodes LEDs and one or plural drive thyristors S connected in series with each other. In FIG. 7, each light-emitting section 22 includes only one light-emitting diode LED and one drive thyristor S. The light-emitting diode LED and the drive thyristor S are an example of a light-emitting element having a thyristor function.

Operation of Setter and Light-Emitting Section

In the following description, the reference voltage terminal 28 may also be called a GND terminal, the setter voltage terminal 24-3 may also be called a VGK terminal, the signal terminal 24-1 may also be called a φ1 terminal, the signal terminal 24-2 may also be called a φ2 terminal, the power supply voltage terminal 24-4 may also be called a VLD terminal, and the driver signal terminal (back-side electrode 79) may also be called a Vdv terminal. The reference voltage Vga may also be called a ground potential GND, the setter voltage VGK may also be called a setter potential VGK, and the power supply voltage VLD may also be called a light-emitting voltage VLD. For the sake of description, the same element or the same voltage (potential) may be designated by different reference numerals or characters.

A driver voltage Vdrv is output from a driver Drv which turns ON and OFF the light-emitting current and is supplied to the LED of the light-emitting section 22 via the Vdrv terminal and a driver voltage line 75.

The light-emitting section 22 includes a light-emitting diode as an example of a light-emitting element. In the exemplary embodiment, the light-emitting section 22 also includes a drive thyristor as an example of an element which controls the light emission of the light-emitting diode as a result of a current flowing therethrough. The drive thyristor is also an example of an element which is set by the setter 26 to a state in which it can emit light. The light-emitting section 22 includes multiple vertical cavity surface emitting laser LEDs, which are an example of light-emitting diodes, and multiple drive thyristors S. Hereinafter, surface-emitting LEDs will simply be called LEDs. In FIG. 7, six LEDs (LED(1) through LED(6)) and six drive thyristors S (drive thyristors S(1) through S(6)) are shown. Hereinafter, the LED(1) through LED(6) may collectively be called the LED unless it is necessary to distinguish them from each other. Likewise, the drive thyristors S(1) through S(6) may collectively be called the drive thyristor S unless it is necessary to distinguish them from each other. The anode of the LED and the cathode of the drive thyristor S are connected to each other. That is, the LED and the drive thyristor S denoted by the same number are connected in series with each other. The six LEDs and the six drive thyristors S are arranged from one side (−x direction) to the other side (+x direction) of the light-emitting unit 4. The series-connected LED and drive thyristor S is an example of the light-emitting section 22. The light-emitting section 22 may be an element including a thyristor whose pn junction emits light. The light-emitting section 22 may be an element that is set to a state in which it can emit light without having a thyristor.

The setter 26 includes multiple shift thyristors T, coupling transistors Q, power supply line resistors Rg, current limiting resistors RL, and coupling resistors Rc. The shift thyristor T is an example of a setting element. In FIG. 7, six shift thyristors T (shift thyristors T(1) through T(6)) and six coupling transistors Q (coupling transistors Q(1) through Q(6)) are shown. Hereinafter, the shift thyristors T(1) through T(6) may collectively be called the shift thyristor T unless it is necessary to distinguish them from each other. Likewise, the coupling transistors Q(1) through Q(6) may collectively be called the coupling transistor Q unless it is necessary to distinguish them from each other. The setter 26 also includes six power supply line resistors Rg, six current limiting resistors RL, and six coupling resistors Rc, which are not denoted by numbers. A shift thyristor T, a coupling transistor Q, a power supply line resistor Rg, a current limiting resistor RL, and a coupling resistor Rc form a shift circuit 27. Six shift circuits 27-1 through 27-6 are arranged from one side (−x direction) to the other side (+x direction) of the setter 26. The setter 26 includes a power supply line resistor Rg and a start resistor Rs at the end of one side (−x direction). The light-emitting unit 4 also includes current limiting resistors R1 and R2.

The coupling transistor Q in the shift circuit 27 is connected to the drive thyristor S of the light-emitting section 22. That is, the shift thyristors S(1) through S(6) are respectively connected to the coupling transistors Q(1) through Q(6), and the coupling transistors Q(1) through Q(6) are respectively connected to the drive thyristors S(1) through S(6). In the example in FIG. 7, the six shift thyristors T, six coupling transistors Q, and six pairs of drive thyristors S and LEDs are shown, but the numbers of these elements may be other than six.

In the light-emitting unit 4, the VGK terminal is connected to a setter voltage line 76, the GND terminal is connected to a ground line 71, the φ1 terminal is connected to a first signal line 77-1, the φ2 terminal is connected to a second signal line 77-2, the VLD terminal is connected to a power supply voltage line 74, and the Vdrv terminal is connected to a driver voltage line 75. The first and second signal lines 77-1 and 77-2 will be called the signal line 77 unless it is necessary to distinguish them from each other.

The power source P2 generates the setter voltage VGK.

The light-emitting power source P1 generates the light-emitting voltage VLD and supplies it to the VLD terminal of the light-emitting unit 4. The driver Drv uses an NMOS transistor, for example, as a driver element and is turned ON/OFF by a light-emitting signal pI applied to the gate of the NMOS transistor. The source of the NMOS transistor is grounded, while the drain thereof is connected to the Vdrv terminal via a light-emitting current limiting resistor RI. When the driver Drv is turned ON, it supplies the ground potential GND to the Vdrv terminal of the light-emitting unit 4. The driver Drv has a preset ON-resistance Ron and a preset OFF-resistance Roff, which will be discussed later.

The ON-resistance Ron is the resistance when the driver Drv is ON, while the OFF-resistance Roff is the resistance when the driver Drv is OFF. The OFF-resistance Roff may be formed by adjusting the structure of the NMOS transistor or by controlling the gate voltage of the NMOS transistor. Alternatively, the OFF-resistance Roff may be formed by disposing a resistor in parallel with between the source and the drain of an NMOS transistor having a sufficiently high OFF resistance. Instead of an NMOS transistor, another element, such as an insulated gate bipolar transistor (IGBT), may be used.

The relationship between the elements of the light-emitting unit 4 will be explained below by using the enlarged diagram of FIG. 8A. The drive thyristor S, the shift thyristor T, and the coupling transistor Q may also be called a light-emission control thyristor, a shift thyristor, and a coupling transistor, respectively, without using the corresponding alphabetical characters. The drive thyristor S and the shift thyristor T may collectively be called the thyristor when it is not necessary to distinguish them from each other.

Operations of Shift Thyristor, Coupling Transistor, LED, and Drive Thyristor

The basic operation of the light-emitting unit 4 will be explained below.

Each of the shift thyristor and the drive thyristor is an npnp thyristor. Each thyristor has an n-type cathode K (hereinafter simply called the cathode K), a p-type gate Gp (hereinafter simply called the p-gate Gp), an n-type gate Gn (hereinafter simply called the n-gate Gn), and a p-type anode A (hereinafter simply called the anode A). The drive thyristor S does not use the p-gate Gp for a control operation, and thus, the p-gate Gp of the drive thyristor S is not indicated in the drawings.

The coupling transistor is a multi-collector npn bipolar transistor. The coupling transistor has an n-type emitter E (hereinafter simply called the emitter E), a p-type base B (hereinafter simply called the base B), and n-type collectors Cf and Cs (hereinafter simply called the collectors Cf and Cs).

The above-described alphabetical characters for the thyristor are used for all the thyristors, and the above-described alphabetical characters for the coupling transistor are used for all the coupling transistors. Bipolar transistors forming a thyristor discussed below are also represented by these symbols. The thyristor is constituted by a combination of a single-collector npn bipolar transistor and a single-collector pnp bipolar transistor, which will be discussed later, and is thus also represented by an emitter E, a base B, and a collector C. Hereinafter, the anode, cathode, n-gate, p-gate, emitter, base, and collector will be called the anode A, cathode K, n-gate Gn, p-gate Gp, emitter E, base B, and collector C, respectively, even when these alphabetical characters are not shown in the drawings.

The shift thyristor T, the coupling transistor Q, and a set of the drive thyristor S and the LED are formed by a III-V compound semiconductor, such as GaAs. The forward voltage (diffusion potential) Vd at the junction of this compound semiconductor is set to be 1.5 V, while the saturation voltage Vc of a bipolar transistor formed by the compound semiconductor is set to be 0.3 V. In the exemplary embodiment, the ground potential GND is set to be 0 V, the setter voltage VGK is set to be 5 V, and the light-emitting voltage VLD is set to be 10 V. For the shift signals p1 and p2 and the light-emitting signal pI, the L level is 0 V ("L" (0 V)) and the H level is 5 V ("H" (5 V)). When the light-emitting signal pI is made to have "L" (0 V), the driver Drv is turned OFF. When the light-emitting signal pI is made to have "H" (5 V), the driver Drv is turned ON.

Figures 8A, 8B:
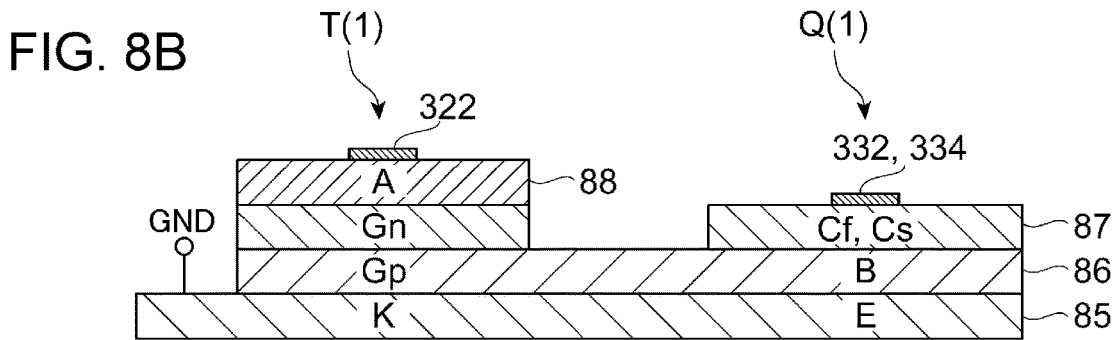
FIG. 8A is an equivalent circuit diagram for explaining the operation of the light-emitting unit.
FIG. 8B is a partial sectional view illustrating a shift thyristor and a coupling transistor shown in FIG. 8A.

FIG. 8A is an equivalent circuit diagram for explaining the operation of the light-emitting unit 4. FIG. 8B is a partial sectional view illustrating the shift thyristor T(1) and the coupling transistor Q(1) shown in FIG. 8A.

As shown in FIG. 8A, the shift thyristor T(1) is constituted by a combination of an npn bipolar transistor Tr1 (hereinafter called the npn transistor Tr1) and a pnp bipolar transistor Tr2 (hereinafter called the pnp transistor Tr2). The base B of the npn transistor Tr1 is connected to the collector C of the pnp transistor Tr2. The collector C of the npn transistor Tr1 is connected to the base B of the pnp transistor Tr2. The emitter E of the npn transistor Tr1 serves as the cathode K of the shift thyristor T(1). The collector C of the npn transistor Tr1 (base B of the pnp transistor Tr2) serves as the n-gate Gn of the shift thyristor T(1). The collector C of the pnp transistor Tr2 (base B of the npn transistor Tr1) serves as the p-gate Gp of the shift thyristor T(1). The emitter E of the pnp transistor Tr2 serves as the anode A of the shift thyristor T(1). The emitter E of the npn transistor Tr1, which serves as the cathode K of the shift thyristor T(1), is connected to the reference voltage line 73 and the ground line 71 connected to the GND terminal to which the ground potential GND is supplied. The emitter E of the pnp transistor Tr2, which serves as the anode A of the shift thyristor T(1), is connected to the first signal line 77-1 connected to the φ1 terminal. The n-gate Gn is connected to a node between the start resistor Rs and the power supply line resistor Rg connected in series with each other. The end of the start resistor Rs, which is not the end connected to the power supply line resistor Rg, is connected to the second signal line 77-2 connected to the φ2 terminal. The end of the power supply line resistor Rg, which is not the end connected to the start resistor Rs, is connected to the setter voltage line 76 connected to the VGK terminal to which the setter voltage VGK is supplied. The shift signal p1 is supplied to the φ1 terminal, while the shift signal p2 is supplied to the φ2 terminal.

Regarding the coupling transistor Q(1), which is an npn transistor, the base B is connected to the p-gate Gp of the shift thyristor T(1) (the base B of the npn transistor Tr1 and the collector C of the pnp transistor Tr2), and the emitter E is connected to the ground line 71. The collector Cf is connected via the series-connected coupling resistor Rc and power supply line resistor Rg to the setter voltage line 76 to which the setter voltage VGK is supplied. The node between the coupling resistor Rc and the power supply line resistor Rg is connected to the n-gate Gn of the shift thyristor T(2).

The npn transistor Tr1 of the shift thyristor T(1) and the coupling transistor Q(1) form a current mirror circuit. That is, a current proportional to a current flowing through the npn transistor Tr1 flows through the coupling transistor Q(1).

The collector Cs of the coupling transistor Q(1) is connected to the n-gate Gn of the drive thyristor S(1) and is also connected via the current limiting resistor RL to the power supply voltage line 74 connected to the VLD terminal to which the light-emitting voltage VLD is supplied.

As stated above, the LED(1) and the drive thyristor S(1) are connected in series with each other. That is, the anode A of the LED(1) and the cathode K of the drive thyristor S(1) are connected to each other. The anode A of the drive thyristor S(1) is connected to the power supply voltage line 74. The cathode K of the LED(1) is connected to the driver voltage line 75 connected to the Vdrv terminal to which the driver voltage Vdrv is supplied.

The anode A of the shift thyristor T(2) is connected to the second signal line 77-2 connected to the φ2 terminal. As shown in FIG. 7, the anodes A of the odd-numbered shift thyristors T are connected to the first signal line 77-1, while the anodes A of the even-numbered shift thyristors T are connected to the second signal line 77-2. Except for the connection relationship of the shift thyristors T to the first and second signal lines 77-1 and 77-2, the connection relationship between the shift thyristor T(2), coupling transistor Q(2), drive thyristor S(2), and LED(2) through the connection relationship between the shift thyristor T(6), coupling transistor Q(6), drive thyristor S(6), and LED(6) are similar to that of the shift thyristor T(1), coupling transistor Q(1), drive thyristor S(1), and LED(1). Hereinafter, the shift signals p1 and p2 may also be indicated by the shift signals p1(φ1) and p2(φ2), respectively.

The operation of the shift thyristor T(1) will first be discussed below.

The setter voltage line 76 is set at the setter voltage VGK (5 V), and the ground line 71 is set at the ground potential GND (0 V). The shift signals p1(φ1) and p2(φ2) are at "L" (0 V). At this time, the npn transistor Tr1 and the pnp transistor Tr2 forming the shift thyristor T(1) are in the OFF state. The n-gate Gn of the shift thyristor T(1) is connected to the node between the start resistor Rs and the power supply line resistor Rg connected in series with each other. The end of the start resistor Rs, which is not the end connected to the power supply line resistor Rg, is connected to the second signal line 77-2 at "L" (0 V). The end of the power supply line resistor Rg, which is not the end connected to the start resistor Rs, is connected to the setter voltage line 76 at 5 V. Accordingly, the n-gate Gn is at the voltage obtained by distributing 5 V (voltage difference) between the start resistor Rs and the power supply line resistor Rg. If the voltage ratio between the start resistor Rs and the power supply line resistor Rg is 1:5, for example, the voltage at the n-gate Gn is 0.83 V. The light-emitting signal pI is at "L" (0 V) and the driver Drv is OFF. Accordingly, the driver voltage Vdrv is not supplied to the driver voltage line 75. The above-described state is the initial state.

When the shift signal p1(φ1) is changed from "L" (0 V) to "H" (5 V), the voltage difference (4.17 V) between the emitter E ("H" (5 V)) and the base B (n-gate Gn) (0.83 V) of the pnp transistor Tr2 exceeds the forward voltage Vd (1.5 V), and the junction between the emitter E and the base B is forward-biased. The pnp transistor Tr2 is thus shifted from the OFF state to the ON state. Then, the voltage at the collector C of the pnp transistor Tr2 (the base B of the npn transistor T1) results in 4.7 V obtained by subtracting the saturation voltage Vc (0.3 V) from the voltage at the emitter E ("H" (5 V)). The voltage difference (4.7 V) between the emitter E (0 V) and the base B (4.7 V) of the npn transistor Tr1 exceeds the forward voltage Vd (1.5 V). The junction between the emitter E and the base B is thus forward-biased, and the npn transistor Tr1 is shifted from the OFF state to the ON state. Since both of the npn transistor Tr1 and the pnp transistor Tr2 of the shift thyristor T(1) are turned ON, the shift thyristor T(1) is shifted from the OFF state to the ON state. "The shift thyristor T is shifted from the OFF state to the ON state" may also be called "the shift thyristor T is turned ON". "The shift thyristor T is shifted from the ON state to the OFF state" may also be called "the shift thyristor T is turned OFF".

When the shift signal p1 (φ1) is shifted from "L" (0 V) to "H" (5 V) in the initial state, the shift thyristor T(1) is turned ON and is shifted from the OFF state to the ON state. The state in which the shift thyristor T can be turned ON when the anode A is made to have "H" (5 V) will be called "the shift thyristor T is in a state in which it can shift to the ON state". This also applies to other shift thyristors.

When the shift thyristor T(1) is turned ON, the voltage at the n-gate Gn of the shift thyristor T(1) is changed to 0.3 V, which is the saturation voltage Vc. The voltage at the anode A is determined by the total voltage (Vd+Vc) of the forward voltage Vd and the saturation voltage Vc and by a voltage drop due to the internal resistance of the shift thyristor T. In this example, the voltage at the anode A is assumed to be 1.9 V. That is, when the shift thyristor T(1) is turned ON, the voltage of the first signal line 77-1 is shifted from 5 V to 1.9 V. Then, the voltage at the p-gate Gp of the shift thyristor T(1) is changed to 1.6 V.

As described above, the shift thyristor T(1) is turned ON when the voltage at the n-gate Gn becomes lower than the voltage at the anode A by a value equal to the forward voltage Vd (1.5 V) or greater. The shift thyristor T(1) is turned OFF when the voltage of the first signal line 77-1 (the voltage across the anode A and the cathode K) becomes lower than the above-described value, that is, 1.9 V. For example, when the anode A is made to have "L" (0 V), the voltage difference between the anode A and the cathode K is changed to 0 V, and the shift thyristor T(1) is turned OFF. On the other hand, when the voltage of the first signal line 77-1 (voltage difference between the anode A and the cathode K) is 1.9 V or greater, the ON state of the shift thyristor T(1) is maintained. Hence, 1.9 V will be called the holding voltage. Even with the application of the holding voltage, if a current for holding the ON state of the shift thyristor T(1) is not supplied, the ON state of the shift thyristor T(1) is not maintained. The current for holding the ON state will be called the holding current.

Next, the operation of the coupling transistor Q(1) will be explained below.

When the shift thyristor T(1) is in the OFF state, the npn transistor Tr1 is also in the OFF state. Accordingly, the coupling transistor Q(1) is also in the OFF state. At this time, the emitter E of the coupling transistor Q(1) is set at the ground potential GND (0 V). The voltage at the collector Cf becomes equal to the setter voltage VGK (5 V) via the series-connected power supply line resistor Rg and coupling resistor Rc. The voltage at the collector Cs becomes equal to the light-emitting voltage VLD (10 V) via the current limiting resistor RL.

When the shift thyristor T(1) is turned ON, that is, when the npn transistor Tr1 enters the ON state, the p-gate Gp of the shift thyristor T(1) is changed to 1.6 V, as discussed above. Since the base B of the coupling transistor Q(1) is connected to the p-gate Gp of the shift thyristor T(1), the voltage at the junction between the emitter E and the base B becomes greater than or equal to the forward voltage Vd (1.5 V). That is, the junction between the emitter E and the base B is forward-biased, and the coupling transistor Q(1) is shifted from the OFF state to the ON state. Then, the voltage at the collector Cf becomes equal to the saturation voltage Vc (0.3 V). The voltage at the collector Cs will be discussed later. The voltage at the node between the power supply line resistor Rg and the coupling resistor Rc (n-gate Gn of the shift thyristor T(2)) is determined as follows. The voltage difference between the voltage (5 V) of the setter voltage line 76 and the voltage (0.3 V) of the collector Cf is 4.7 V. The voltage obtained by distributing 4.7 V between the power supply line resistor Rg and the coupling resistor Rc is the voltage at the node between the power supply line resistor Rg and the coupling resistor Rc. If the voltage ratio between the power supply line resistor Rg and the coupling resistor Rc is 5:1, for example, the voltage at the node between the power supply line resistor Rg and the coupling resistor Rc (n-gate Gn of the shift thyristor T(2)) is 1.08 V.

The anode A of the shift thyristor T(2) is connected to the second signal line 77-2 to which the shift signal p2(φ2) is supplied. Since the shift signal p2(φ2) is at "L" (0 V), the shift thyristor T(2) is not turned ON. When the shift signal p2(φ2) is changed from "L" (0 V) to "H" (5 V), the voltage at the anode A of the shift thyristor T(2) is changed to "H" (5 V). The voltage difference (3.92 V) between the anode A and the n-gate Gn (1.08 V) becomes higher than the forward voltage Vd (1.5 V). That is, the junction between the n-gate Gn and the anode A is forward-biased, and the shift thyristor T(2) is turned ON. In this manner, multiple elements are provided and the element which is turned ON is sequentially shifted. This operation is called a shift operation. In the exemplary embodiment of the specification, elements to be turned ON or OFF are setting elements.

The operation of the drive thyristor S(1) and the LED(1) will be discussed below.

The collector Cs of the coupling transistor Q(1) is connected to the n-gate Gn of the drive thyristor S(1). When the coupling transistor Q(1) is turned ON, the pn junction between the anode A and the n-gate Gn of the drive thyristor S(1) is forward-biased. The collector Cs of the coupling transistor Q(1) draws a current from the light-emitting voltage VLD via the pn junction between the anode A and the n-gate Gn of the drive thyristor S(1), so that the voltage at the collector Cs results in substantially 8.5 V, which is obtained by subtracting the forward voltage Vd (1.5 V) from the light-emitting voltage VLD (10 V). Then, the driver Drv is turned ON, and when the driver voltage Vdrv is changed to the GND voltage (0 V), the cathode K of the LED(1) is changed to 0 V. The voltage difference (10 V) between the light-emitting voltage VLD (10 V) and the driver voltage Vdrv (0 V) is thus applied to between the anode A of the drive thyristor S(1) and the cathode K of the LED(1). This turns ON the drive thyristor S(1), causing a current to flow through the drive thyristor S(1) and the LED(1) connected in series with each other. The LED(1) thus emits light. The state in which the coupling transistor Q(1) is turned ON and the n-gate Gn of the drive thyristor S(1) is at 3.5 V is a state in which the LED(1) emits light when the driver Drv is turned ON. The state in which the coupling transistor Q(1) is turned ON and the junction between the anode A and the n-gate Gn of the drive thyristor S(1) is changed to 3.5 V is a state in which the LED(1) can emit light when the driver Drv is turned ON. Hence, the state in which the coupling transistor Q(1) is turned ON and the junction between the anode A and the n-gate Gn of the drive thyristor S(1) is forward-biased to 3.5 V will be called a state in which the LED(1) can emit light. The drive thyristor S controls the light emission of the LED, that is, it drives the LED, by using the potential of the n-gate Gn and may thus also be called a light-emission control thyristor.

In the initial state, the setter voltage line 76 is at the setter voltage VGK (5 V), the ground line 71 is at the ground potential GND (0 V), the shift signals p1(φ1) and p2(φ2) are at "L" (0 V), the driver Drv is OFF, and the driver voltage Vdrv is not supplied to the driver voltage line 75. In the initial state, the shift thyristor T(1) enters a state in which it can shift to the ON state. Then, when the shift signal p1(φ1) (first signal line 77-1) is changed from "L" (0 V) to "H" (5 V), the shift thyristor T(1) is turned ON and shifts from the OFF state to the ON state. Then, the coupling transistor Q(1)

is shifted from the OFF state to the ON state. Then, the anode A and the n-gate Gn of the drive thyristor S(1) is forward-biased and the LED(1) enters a state in which it can emit light. When the coupling transistor Q(1) is in the ON state, the shift thyristor T(2) enters a state in which it can shift to the ON state. When the shift signal p2(φ2) (second signal line 77-2) is changed from "L" (0 V) to "H" (5 V), the shift thyristor T(2) is turned ON. When the shift signal p1(φ1) (first signal line 77-1) is changed from "H" (5 V) to "L" (0 V), the shift thyristor T(1) is turned OFF since the cathode K and the anode A are made to have "L" (0 V). The other shift thyristors T, coupling transistors Q, drive thyristors S, and LEDs are operated in a similar manner. In the exemplary embodiment, the setter 26 shifts a setting element (shift thyristor T) which is to be turned ON between multiple setting elements so as to set the corresponding drive thyristor S to be the ON state. This drive thyristor S is connected to a light-emitting LED which is to emit light among multiple light-emitting LEDs.

Figures 9A, 9B:
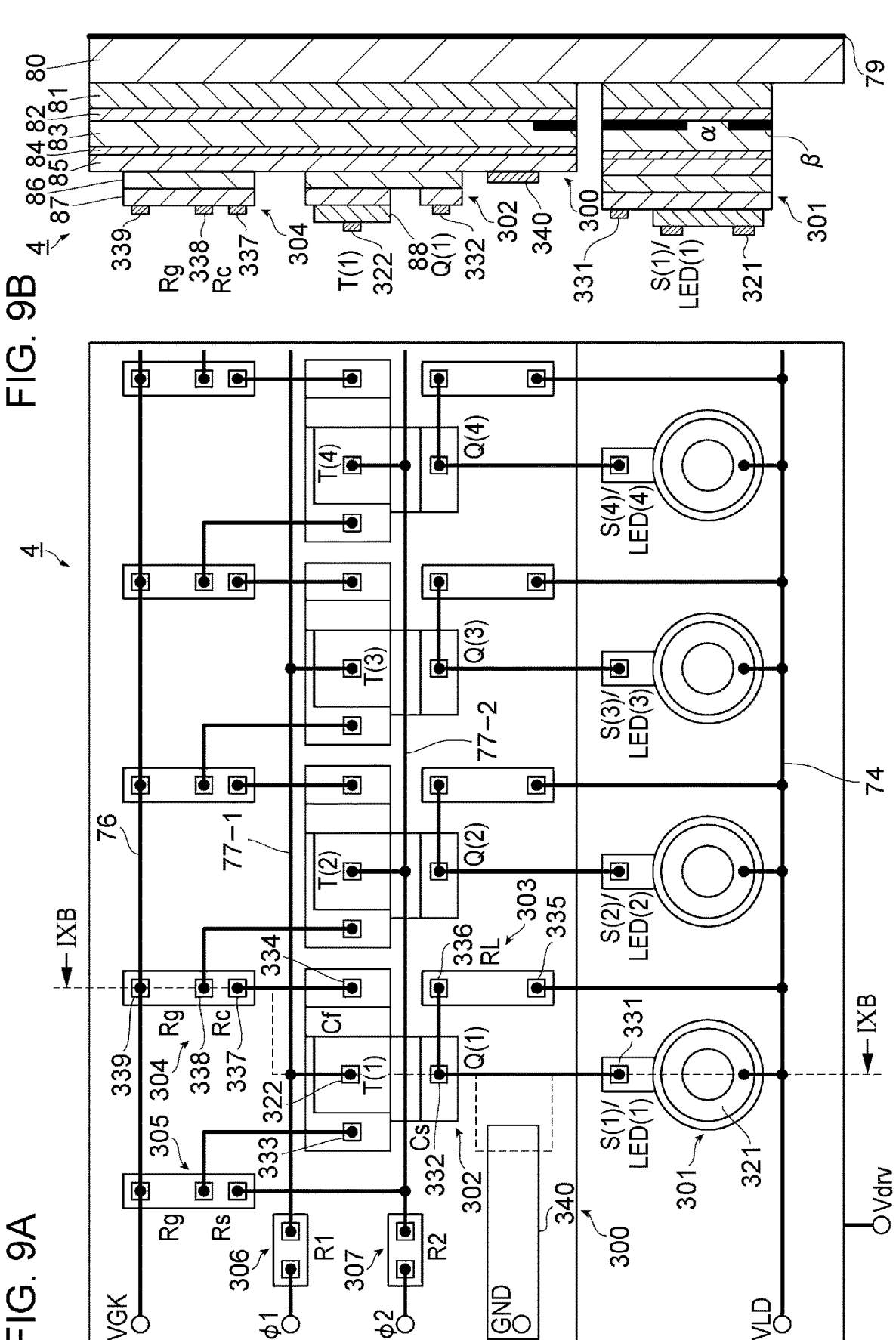
FIG. 9A illustrates the layout of the light-emitting unit according to the exemplary embodiment.
FIG. 9B is a sectional view taken along line IXB-IXB in FIG. 9A.

FIGS. 9A and 9B are respectively a plan view and a sectional view of the light-emitting unit 4. FIG. 9A illustrates the layout of the light-emitting unit 4. FIG. 9B is a sectional view taken along line IXB-IXB in FIG. 9A. In FIG. 9A, the shift thyristors T(1) through T(4), coupling transistors Q(1) through Q(4), drive thyristors S(1) through S(4), and LED(1) through LED(4) are mainly shown. In FIG. 9B, the cross sections of the drive thyristor S(1), LED(1), shift thyristor T(1), coupling transistor Q(1), and coupling resistor Rc and power supply line resistor Rg connected to the coupling transistor Q(1) are shown.

As shown in FIGS. 8B and 9B, the light-emitting unit 4 is constituted by multiple semiconductor layers stacked on each other. FIG. 8B illustrates multilayers forming part of the light-emitting unit 4, that is, an n-type semiconductor layer 85, a p-type semiconductor layer 86, an n-type semiconductor layer 87, and a p-type semiconductor layer 88 forming the shift thyristor T(1) and the coupling transistor Q(1). The shift thyristor T(1) uses the n-type semiconductor layer 85 as the cathode K, the p-type semiconductor layer 86 as the p-gate Gp, the n-type semiconductor layer 87 as the n-gate Gn, and the p-type semiconductor layer 88 as the anode A. The coupling transistor Q(1) uses the n-type semiconductor layer 85 as the emitter E, the p-type semiconductor layer 86 as the base B, and the n-type semiconductor layer 87 as the collectors Cf and Cs. The cathode K of the shift thyristor T(1) and the emitter E of the coupling transistor Q(1) are electrically connected to each other via the n-type semiconductor layer 85. Likewise, the p-gate Gp of the shift thyristor T(1) and the base B of the coupling transistor Q(1) are electrically connected to each other via the p-type semiconductor layer 86. Although the n-gate Gn of the shift thyristor T(1) and the collectors Cf and Cs of the coupling transistor Q(1) form the n-type semiconductor layer 87, they are separated from each other. The other shift thyristors T and coupling transistors Q are formed in a similar manner.

As shown in FIG. 9B, the light-emitting unit 4 is constituted by an n-type semiconductor substrate 80 and multilayers stacked on the n-type semiconductor substrate 80. The multilayers are constituted by an n-type semiconductor layer 81, an active layer 82, a p-type semiconductor layer 83, a tunnel junction layer 84, an n-type semiconductor layer 85, a p-type semiconductor layer 86, an n-type semiconductor layer 87, and a p-type semiconductor layer 88. Elements, such as the shift thyristor T, coupling transistor Q, drive thyristor S, LED, are constituted by plural islands, which are separated from each other by entirely or partially removing some semiconductor layers by etching. An island may also be called a mesa. Etching performed to form an island (mesa) may also be called mesa etching. Islands (islands 300 and 301 through 307) will be explained by mainly referring to the island 301 including the drive thyristor S(1) and the LED(1) and the island 302 including the shift thyristor T(1) and the coupling transistor Q(1).

The island 300 is a region where the setter 26 (see FIG. 7), such as the shift thyristor T(1) and the coupling transistor Q(1), is disposed. The n-type semiconductor layer 81, active layer 82, p-type semiconductor layer 83, tunnel junction layer 84, and n-type semiconductor layer 85 entirely remain on the n-type semiconductor substrate 80.

In the island 301, the LED(1) and the drive thyristor S(1) are stacked on each other. The shift thyristor T(1) and the coupling transistor Q(1) shown in FIG. 8B are disposed in the island 302. The current limiting resistor RL is disposed in the island 303. The power supply line resistor Rg and the coupling resistor Rc are disposed in the island 304. The power supply line resistor Rg and the start resistor Rs are disposed in the island 305. The current limiting resistor R1 is disposed in the island 306. The current limiting resistor R2 is disposed in the island 307.

In FIGS. 9A and 9B, the n-type semiconductor layer 81, active layer 82, p-type semiconductor layer 83, tunnel junction layer 84, and n-type semiconductor layer 85, p-type semiconductor layer 86, n-type semiconductor layer 87, and p-type semiconductor layer 88 around the island 301 are removed by etching. A p-ohmic electrode 321, which is likely to easily ohmic-contact a p-type semiconductor layer, is provided on the p-type semiconductor layer 88. An n-ohmic electrode 331, which is likely to easily ohmic-contact an n-type semiconductor layer, is provided on the n-type semiconductor layer 87 which is exposed by removing the p-type semiconductor layer 88. The LED(1) uses the n-type semiconductor layer 81 as the cathode K (see FIG. 8A), the active layer 82 as an active layer, the p-type semiconductor layer 83 as the anode A. The drive thyristor S(1) uses the n-type semiconductor layer 85 as the cathode K, the p-type semiconductor layer 86 as the p-gate Gp (p-gate layer), the n-type semiconductor layer 87 as the n-gate Gn (n-gate layer), and the p-type semiconductor layer 88 as the anode A. The n-ohmic electrode 331 is used as the n-gate Gn of the drive thyristor S(1).

As shown in FIG. 9B, the LED(1) is disposed on the n-type semiconductor substrate 80, and the drive thyristor S(1) is disposed on the LED(1) with the tunnel junction layer 84 interposed therebetween. The tunnel junction layer 84 is provided to minimize a situation where a current does not flow between the p-type semiconductor layer 83 of the LED(1) and the n-type semiconductor layer 85 of the drive thyristor S(1) due to reverse biasing therebetween. The tunnel junction layer 84 is a junction between an n++ layer highly doped with an n-type impurity and a p++ layer highly doped with a p-type impurity. A current flows through the tunnel junction layer 84 due to the tunnel effect even when the p-type semiconductor layer 83 and the n-type semiconductor layer 85 are reverse-biased.

The island 301 is formed cylindrically, except for a region where the n-ohmic electrode 331 is provided. The p-ohmic electrode 321, which is formed in a ring-like shape, is disposed on the p-type semiconductor layer 88 of the cylindrical island 301. Part of the p-type semiconductor layer 83, which is exposed by etching, is oxidized from the peripheral portion of the cylindrical p-type semiconductor layer 83 and serves as a current blocking portion β. The current blocking portion β is formed in a ring-like shape where a current is less likely to flow. The center of the cylindrical p-type semiconductor layer 83, which is not oxidized, serves as a current passing portion α where a current is more likely to flow. Then, light is output from a portion surrounded by the ring-like p-ohmic electrode 321. The current blocking portion β is formed in the following manner. An AlAs layer or an AlGaAs layer having a high Al density is provided in the p-type semiconductor layer 83. Then, the p-type semiconductor layer 83 is oxidized from the exposed peripheral portion, that is, Al is oxidized, thereby forming the current blocking portion β. The peripheral portion of the LED(1) suffers from many defects due to etching and are thus likely to cause the occurrence of non-radiative recombination. The provision of the current blocking portion β makes it less likely to consume power which would be used for non-radiative recombination, thereby enhancing power saving and light emission efficiency. The light emission efficiency is represented by the amount of light that can be emitted per unit power.

In the example shown in FIGS. 9A and 9B, the LED(1) emits light, which passes through the drive thyristor S(1) and is output. In the island 301, the portion of the drive thyristor S(1) (tunnel junction layer 84 and semiconductor layers 85 through 88) where light passes through may be removed. In this case, the drive thyristor S(1) is formed in a doughnut shape. With this arrangement, light emitted from the LED(1) is less likely to be absorbed in the drive thyristor S(1) and the amount of light is less likely to be decreased.

The p-type semiconductor layer 86, n-type semiconductor layer 87, and p-type semiconductor layer 88 around the island 302 are removed by etching (see FIG. 9B). A p-ohmic electrode 322 is provided on the p-type semiconductor layer 88. The p-ohmic electrode 322 is an electrode (anode A electrode) which is connected to the anode A of the shift thyristor T(1) and which is connected to the first signal line 77-1 to which the shift signal p1(φ1) is supplied. Three n-ohmic electrodes 332, 333, and 334 are provided on the n-type semiconductor layer 87 exposed by removing the p-type semiconductor layer 88. The n-ohmic electrode 332 is an electrode (collector Cs electrode) connected to the collector Cs of the coupling transistor Q(1). The n-ohmic electrode 334 is an electrode (collector Cf electrode) connected to the collector Cf of the coupling transistor Q(1). The n-type semiconductor layer 87 between the p-ohmic electrode 322 and the n-ohmic electrodes 332 and 334 is removed (see FIG. 8B). The n-ohmic electrode 333 is an electrode (n-gate Gn electrode) connected to the n-gate Gn of the shift thyristor T(1).

The p-type semiconductor layer 86, n-type semiconductor layer 87, and p-type semiconductor layer 88 around the island 303 are removed by etching. In the island 303, two n-ohmic electrodes 335 and 336 are provided on the exposed n-type semiconductor layer 87. The n-type semiconductor layer 87 between the two n-ohmic electrodes 335 and 336 serves as the current limiting resistor RL.

The island 304 is formed similarly to the island 303. Three n-ohmic electrodes 337, 338, and 339 are provided on the n-type semiconductor layer 87 exposed by removing the p-type semiconductor layer 88. The n-type semiconductor layer 87 between the n-ohmic electrodes 337 and 338 serves as the coupling resistor Rc, while the n-type semiconductor layer 87 between the n-ohmic electrodes 338 and 339 serves as the power supply line resistor Rg.

The island 305 is formed similarly to the island 304. The start resistor Rs and the power supply line resistor Rg are disposed in the island 305. The islands 306 and 307 are formed similarly to the island 303. The current limiting resistors R1 and R2 are respectively disposed in the islands 306 and 307.

An n-ohmic electrode 340 is provided on the exposed n-type semiconductor layer 85 in the island 300. The back-side electrode 79 is provided on the back side of the n-type semiconductor substrate 80.

The connection relationship between the elements and lines in the light-emitting unit 4 will be discussed below. In FIG. 9A, lines (setter voltage line 76, first and second signal lines 77-1 and 77-2, and power supply voltage line 74) used for connecting elements in the light-emitting unit 4 are indicated by the thick straight lines.

The p-ohmic electrode 321 in the island 301, which is the anode A electrode of the drive thyristor S(1), is connected to the power supply voltage line 74 to which the light-emitting voltage VLD is supplied. The n-ohmic electrode 331 in the island 301, which is the n-gate Gn of the drive thyristor S(1), is connected to the n-ohmic electrode 332 in the island 302, which is the collector Cs electrode of the coupling transistor Q(1). The n-ohmic electrode 332 is connected to the n-ohmic electrode 336 corresponding to the current limiting resistor RL in the island 303. The n-ohmic electrode 335 in the island 303 is connected to the power supply voltage line 74.

The p-ohmic electrode 322 in the island 302, which is the anode A electrode of the shift thyristor T(1), is connected to the first signal line 77-1. The first signal line 77-1 is connected, via the current limiting resistor R1 in the island 306, to the φ1 terminal to which the shift signal p1 is supplied. The n-ohmic electrode 333 in the island 302, which is the n-gate Gn electrode of the shift thyristor T(1), is connected to an n-ohmic electrode, which is a node between the power supply line resistor Rg and the start resistor Rs, in the island 305. The n-ohmic electrode 334 in the island 302, which is the collector Cf electrode of the coupling transistor Q(1), is connected to the n-ohmic electrode 337 in the island 304, which is one of the n-ohmic electrodes corresponding to the coupling resistor Rc.

The n-ohmic electrode 338 in the island 304, which is the other one of the n-ohmic electrodes corresponding to the coupling resistor Rc, is connected to an n-ohmic electrode, which is the n-gate Gn electrode of the shift thyristor T(2). The n-ohmic electrode 339 in the island 304, which is the other one of the n-ohmic electrodes corresponding to the power supply line resistor Rg, is connected to the setter voltage line 76 to which the setter voltage VGK is supplied.

One of the n-ohmic electrodes corresponding to the start resistor Rs in the island 305 is connected to the second signal line 77-2. The other one of the n-ohmic electrodes corresponding to the power supply line resistor Rg in the island 305 is connected to the setter voltage line 76. The second signal line 77-2 is connected, via the current limiting resistor R2 in the island 307, to the φ2 terminal to which the shift signal p2 is supplied.

The first signal line 77-1 is connected to the p-ohmic electrodes, which are the anode A electrodes of the odd-numbered shift thyristors T. The second signal line 77-2 is connected to the p-ohmic electrodes, which are the anode A electrodes of the even-numbered shift thyristors T.

The other shift thyristors T, coupling transistors Q, drive thyristors S, and LEDs are formed similarly to the shift thyristor T(1), coupling transistor Q(1), drive thyristor S(1), and LED(1), respectively.

The n-ohmic electrode 340 disposed on the exposed n-type semiconductor layer 85 in the island 300 serves as the GND terminal to which the ground potential GND is supplied. The back-side electrode 79 on the back side of the n-type semiconductor substrate 80 is the Vdrv terminal to which the driver voltage Vdrv is supplied.

The shift thyristor T and the coupling transistor Q are disposed on the multilayer semiconductor layer (structure) equivalent to that on which the drive thyristor S and the LED are disposed. However, the n-ohmic electrode 340 is disposed on the n-type semiconductor layer 85 and is set to the ground potential GND. The driver voltage Vdrv (≥0 V) is supplied to the back-side electrode 79 on the back side of the n-type semiconductor substrate 80. That is, the potential of the anode A of the p-type semiconductor layer 83 is bound to be lower than that of the cathode K of the n-type semiconductor layer 81, and the pn junction formed by the n-type semiconductor layer 81, active layer 82, and p-type semiconductor layer 83 is not forward-biased. Hence, the n-type semiconductor layer 85 in the island 300 is insulated from the back-side electrode 79.

The light-emitting unit 4 of the exemplary embodiment is disposed on the semiconductor substrate 80 constituted by one semiconductor.

Figure 10:
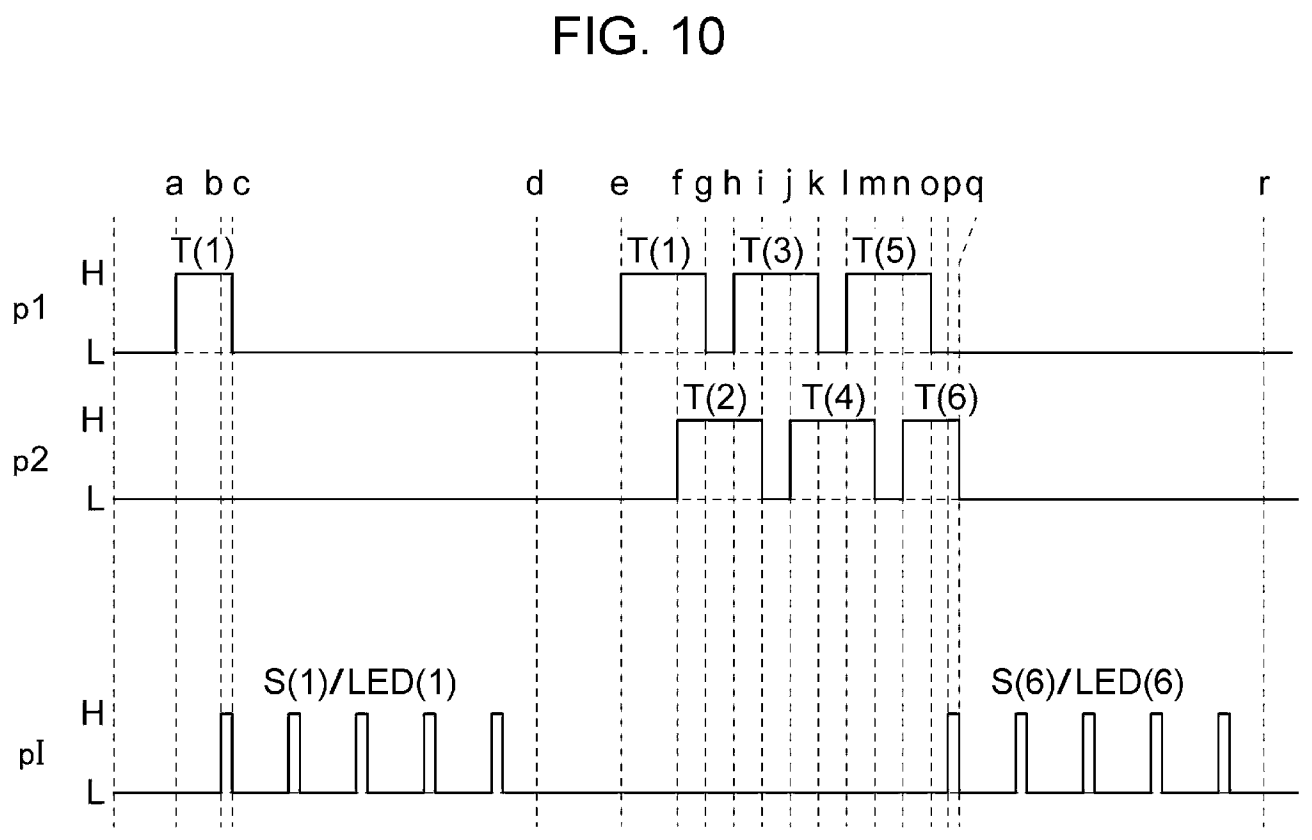

FIG. 10 is a timing chart illustrating the operation of the light-emitting unit 4 according to the exemplary embodiment. The horizontal axis indicates the time, and the time elapses from time a to time r in alphabetical order. In FIG. 10, a temporal change in each of the shift signals p1 and p2 and the light-emitting signal pI is shown, and the shift thyristor T, the drive thyristor S, and the LED which are turned ON are each indicated by its alphabetical character and number. A set of the drive thyristor S and the LED is represented by S/LED.

In this example, among the LED(1) through the LED(6) of the light-emitting unit 4 shown in FIG. 7, the LED(1) and LED(6) are caused to emit light. After the light-emitting unit 4 has caused the LED(1) to emit light from the initial state, it returns to the initial state and then causes the LED(6) to emit light. In this manner, the light-emitting unit 4 causes the LED(1) and the LED(6) to emit light. With this configuration, a desirable LED can be selected and be caused to emit light. In other words, LEDs can randomly emit light.

As discussed above with reference to FIG. 8A, the LED (1) emits light as a result of the shift thyristor T(1) being turned ON, while the LED(6) emits light as a result of the shift thyristor T(6) being turned ON. The LED (1) and LED(6) are each caused to intermittently emit light multiple times (five times in FIG. 10). If the LED is caused to emit light in this manner, the drive thyristor S is more likely to be maintained in a state in which the LED can emit light. Once the shift thyristor T causes the drive thyristor S to be in such a state, the LED is more likely to reemit light regardless of whether the shift thyristor T is ON.

In FIG. 10, before time a, the light-emitting unit 4 is in the initial state. The initial state is a state in which the setter voltage line 76 is at the setter voltage VGK (5 V), the ground line 71 is at the ground potential GND (0 V), the shift signals p1(φ1) and p2(φ2) are at "L" (0 V), the driver Drv is OFF, and the driver voltage Vdrv is not supplied to the driver voltage line 75. In the initial state, the shift thyristor T(1) is in a state in which it can shift to the ON state.

At time a, the shift signal p1 is changed from "L" (0 V) to "H" (5 V). Then, the shift thyristor T(1) is turned ON and shifts from the OFF state to the ON state. Then, the anode A and the n-gate Gn of the drive thyristor S(1) is forward-biased and the LED(1) enters a state in which it can emit light.

At time b, the light-emitting signal pI is changed from "L" (0 V) to "H" (5 V). Then, the driver Drv is changed from OFF to ON and the driver voltage Vdrv is changed to the ground potential GND (0 V). Then, the drive thyristor S(1) is turned ON and the light-emitting voltage VLD (5 V) is applied to between the anode A of the drive thyristor S(1) and the cathode K of the LED(1). Then, a current flows through the drive thyristor S(1) and the LED(1) connected in series with each other, thereby causing the LED(1) to emit light.

At time c, the shift signal p1 is changed from "H" (5 V) to "L" (0 V). Then, the shift thyristor T(1) is turned OFF and shifts from the ON state to the OFF state.

At time c, the light-emitting signal pI is changed from "H" (5 V) to "L" (0 V). Then, a current stops flowing through the anode A of the drive thyristor S(1) and the cathode K of the LED(1), thereby causing the LED(1) to stop emitting light.

Thereafter, during the period from time c to time d, the light-emitting signal pI is switched from "L" (0 V) to "H" (5 V) and from "H" (5 V) to "L" (0 V) four times, thereby causing the LED(1) to emit light four times.

During the period from time c to time d, the shift signal p1(φ1) is at "L" (0 V), the shift thyristor T(1) is OFF, and no current flows through the shift thyristor T(1). The states of the other shift thyristors T are similar to that of the shift thyristor T(1). Power is thus less likely to be consumed in the setter 26.

At time d, the initial state is resumed. At this time, the shift thyristor T(1) is in a state in which it can shift to the ON state.

At time e, the shift signal p1 is changed from "L" (0 V) to "H" (5 V). Then, as in time a, the shift thyristor T(1) is turned ON and shifts from the OFF state to the ON state.

At time f, the shift signal p2 is changed from "L" (0 V) to "H" (5 V). Then, the shift thyristor T(2) is turned ON and shifts from the OFF state to the ON state.

At time g, the shift signal p1 is changed from "H" (5 V) to "L" (0 V). Then, the shift thyristor T(1) is turned OFF.

Then, at time h, the shift thyristor T(3) is turned ON, and, at time i, the shift thyristor T(2) is turned OFF. Then, at time j, the shift thyristor T(4) is turned ON, and, at time k, the shift thyristor T(3) is turned OFF. Then, at time 1, the shift thyristor T(5) is turned ON, and, at time m, the shift thyristor T(4) is turned OFF. Then, at time n, the shift thyristor T(6) is turned ON, and, at time o, the shift thyristor T(5) is turned OFF. At this time, the anode A and the n-gate Gn of the drive thyristor S(6) is forward-biased, and the LED(6) enters a state in which it can emit light.

At time p, the light-emitting signal pI is changed from "L" (0 V) to "H" (5 V). Then, the driver Drv is changed from OFF to ON and the driver voltage Vdrv is changed to the ground potential GND (0 V). Then, the LED(6) emits light, as the LED(1) emits light in time b.

At time q, the shift signal p2 is changed from "H" (5 V) to "L" (0 V). Then, the shift thyristor T(6) is turned OFF.

At time q, the light-emitting signal pI is changed from "H" (5 V) to "L" (0 V). Then, the LED(6) stops emitting light.

Thereafter, during the period from time q to time r, the light-emitting signal pI is switched from "L" (0 V) to "H" (5 V) and from "H" (5 V) to "L" (0 V) four times, thereby causing the LED(6) to emit light four times.

During the period from time q to time r, the shift signal p2(φ2) is at "L" (0 V), the shift thyristor T(6) is OFF, and no current flows through the shift thyristor T(6). The states of the other shift thyristors T are similar to that of the shift thyristor T(6). Power is thus less likely to be consumed in the setter 26.

As described above, between two adjacent shift thyristors T, the setter 26 turns ON the shift thyristor T on the upstream side in the shifting direction and then turns ON the shift thyristor T on the downstream side in the shifting direction. Then, the setter 26 turns OFF the shift thyristor T on the upstream side. In this manner, based on the shift signals (shift signals p1 and p2) out of phase by 180 degrees, the ON state is sequentially shifted among the shift thyristors T, that is, the above-described shift operation is performed. During the shift operation based on the shift signals p1 and p2, there is a period (from time f to time g, for example) for which two adjacent shift thyristors T are ON at the same time.

Comparative Example and Functions of Exemplary Embodiment

Figure 11:
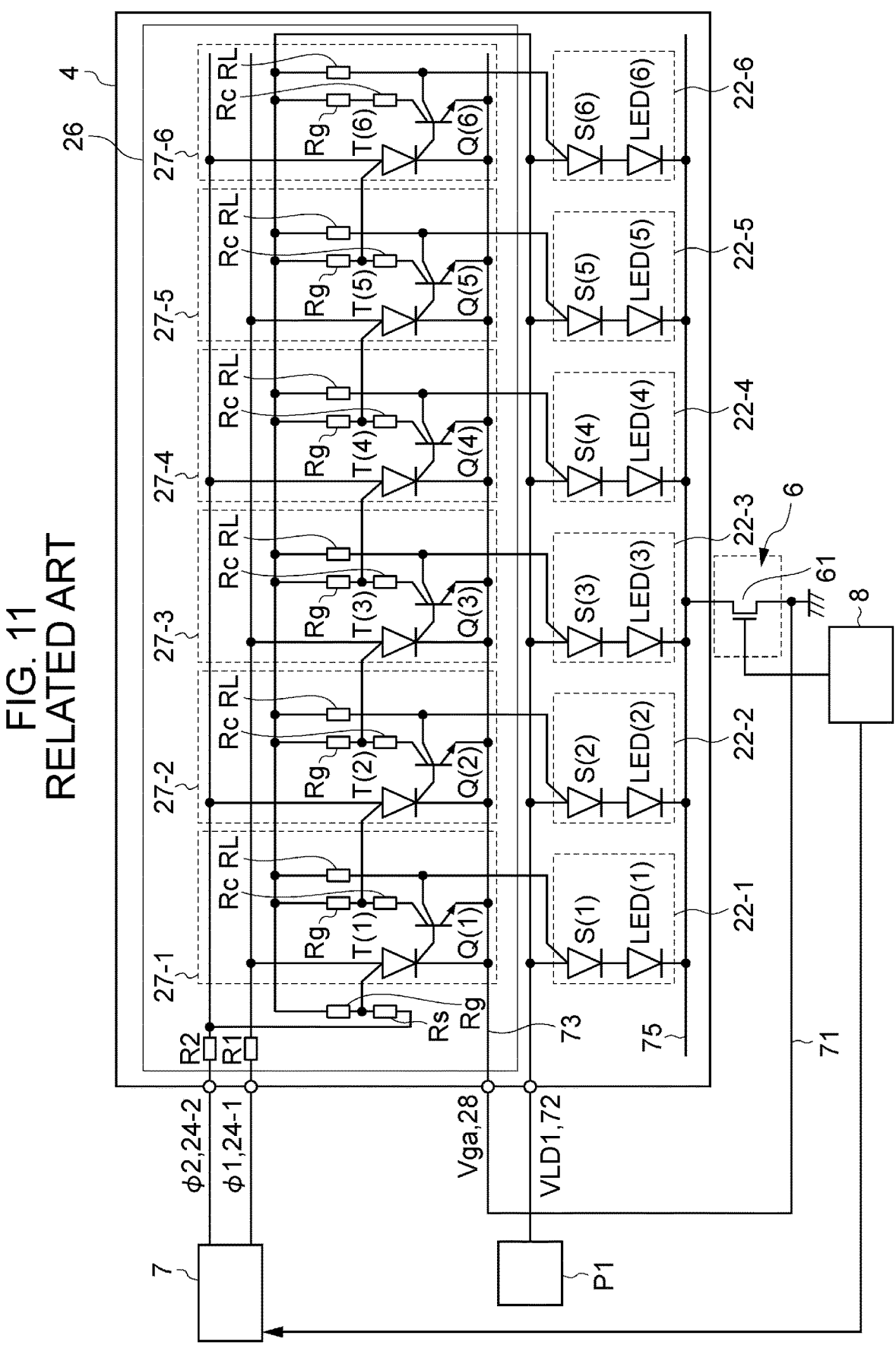
FIG. 11 is an equivalent circuit diagram of a light-emitting unit according to a comparative example for comparison with the light-emitting unit shown in FIG. 7.

FIG. 11 is an equivalent circuit diagram of a light-emitting unit according to a comparative example for comparison with the light-emitting unit 4 of the exemplary embodiment shown in FIG. 7.

In the configuration of the related art, a light source P1 is connected to the light-emitting unit to apply the same voltage to cause a light-emitting diode LED to emit light and to drive the shift thyristor T. That is, the voltage applied from the light source P1 serves as the power supply voltage VLD and the setter voltage VGK in the exemplary embodiment. This voltage in the comparative example will be called a voltage VLD1 (see FIG. 11). When turning ON the light-emitting LED, the voltage VLD1, which is higher than that required for operating the setter 26, is supplied to the light-emitting section 22. This means that the same voltage is also supplied to the setter 26. As a result, more power is consumed in the configuration of the related art than that in the exemplary embodiment.

The voltage VLD1 for causing the light-emitting LED to emit light is the total voltage of the forward voltage VdS between the anode and the cathode of the drive thyristor S in the ON state, the forward voltage VdL between the anode and the cathode of the light-emitting diode LED, a voltage drop Rp*IL when the light-emitting current IL flows through the series resistance Rp of the drive thyristor S and the light-emitting diode LED, and the ON-voltage Von of the driver 6. An example of the ON-voltage Von of the driver 6 is the voltage across the drain and the source of a MOSFET 61. To allow a high light-emitting current IL to flow through a light-emitting section having a high series resistance Rp, it is necessary to increase the voltage VLD1 for the light emission of the light-emitting LED. For example, to allow a current of one ampere (1 A) to flow through a light-emitting LED (VdS=VdL=1.5 V, Von=2 V, and Rp=5Ω), it is necessary to increase VLD1 to 10 V (VLD1=1.5+1.5+1*5+2=10 V).

As discussed above while explaining the operation of the coupling transistor Q(1), when the voltage of the setter voltage line 76 is 5 V, the shift thyristor (1) is turned ON, and the coupling transistor Q(1) is changed from the OFF state to the ON state. Then, the voltage at the collector Cf results in the saturation voltage Vc (0.3 V). However, this is feasible only when the total resistance of the power supply line resistor Rg and the coupling resistor Rc between the collector Cf and VGK is sufficiently high to make the coupling transistor Q(1) saturated. It is now assumed that the current to be supplied from the coupling transistor Q(1) when the shift thyristor T(1) is turned ON is 0.1 mA. In this case, if the total resistance of the power supply line resistor Rg and the coupling resistor Rc is higher than 47 kΩ, the collector voltage results in about 0.3 V. If the total resistance of the power supply line resistor Rg and the coupling resistor Rc is lower than or equal to 47 kΩ, the collector voltage is lowered only to VGK−(Rg+Rc)*0.1 mA.

In the comparative example of the light-emitting unit (VLD=VGK=VLD1) shown in FIG. 11, when VGK=VLD is 10 V and when Rg+Rc is 50 kΩ, for example, the voltage at the node between the power supply line resistor Rg and the coupling resistor Rc (n-gate Gn of the shift thyristor (2)) is determined as follows. The voltage difference between the voltage VGK (=VLD1=10 V) and the voltage at the collector Cf is 5 V (50 kΩ*0.1 mA). The voltage obtained by distributing 5 V between the power supply line resistor Rg and the coupling resistor Rc is the voltage at the node therebetween. If the voltage ratio between the power supply line resistor Rg and the coupling resistor Rc is 5:1, for example, the voltage at the node between the power supply line resistor Rg and the coupling resistor Rc (n-gate Gn of the shift thyristor T(2)) is 5.83 V. When the shift signal p2(φ2) is changed from "L" (0 V) to "H" (5 V) in this state, the anode A of the shift thyristor T(2) is shifted to "H" (5 V) and the voltage difference with the voltage (5.83 V) at the n-gate Gn results in −0.83, which is lower than the forward voltage Vd (1.5 V). That is, the n-gate Gn and the anode A becomes reverse-biased, thereby failing to turn ON the shift thyristor T(2). This means that the shift operation is not performed in the configuration of the related art.

To make it possible to perform the shift operation, some constant values are adjusted so that the coupling transistor Q can be saturated. The following two approaches are possible:
  (1) increasing the collector current of the transistor Tr; and
  (2) raising Rg+Rc.

To increase the collector current in the approach (1), the following two options are possible:
  (1-1) elevating the amplification factor of the transistor; and
  (1-2) raising the base current of the transistor.

To elevate the amplification factor of the transistor in the option (1-1), the collector of the transistor, for example, is made larger. To deal with a high voltage in this manner, however, the area of the setter 26 is increased and a chip having the light-emitting unit thereon also becomes larger. The shift thyristor T having a larger area increases parasitic capacitance, thereby lowering the transfer speed. Additionally, more power is consumed for an increase in the collector current. For example, when VLD1 is 5 V, the anode current of a thyristor is 1 mA, and the collector current is 0.1 mA, power consumption in a gate circuit is calculated as 0.5 mW (5 V*0.1 mA). If the area of the transistor is doubled to make the collector current nearly twice as high to deal with a high voltage (VLD1=10 V), the power consumption is calculated as 2 mW (10 V*0.2 mA). Power consumption in the thyristor (5 V*1 mA=5 mW) is added to 2 mW, resulting in 7 mW. That is, in comparison with power consumption (5.5 mW) when VLD1 is 5 V, power consumption (7 mW) when VLD1 is 10 V is increased by about 30%.

To raise the base current of the transistor in the option (1-2), the anode current of the shift thyristor T constituted by connected transistors is increased. Typically, the anode current of a thyristor and the base current of a transistor are substantially proportional to each other. If the anode current of the thyristor is doubled, the collector current, which is 0.1 mA in the above-described example, can be increased to 0.2 mA at the maximum. This can saturate the transistor. If the anode current of the shift thyristor T is increased in this manner, however, power consumption in the setter 6 is proportionally increased. Additionally, more power is consumed for an increase in the collector current. For example, when VLD1 is 5 V, power consumed in the thyristor is 5 mW (5 V*1 mA). If the anode current of the thyristor is doubled to make the collector current nearly twice as high to deal with a high voltage (VLD1=10 V), the power consumption is calculated as 10 mW (5 V*2 mA). By adding power consumption in the gate circuit, power consumption when VLD1 is 5 V is 5.5 mW, while that when VLD1 is 10 V is 12 mW, which is 2.2 times higher.

To raise the total resistance of Rg+Rc in the approach (2), it is necessary to increase the ratio of the length to the width of the resistor to elevate the resistance value. Due to the semiconductor processing limitations, the width is required to be maintained at a certain value or greater. The length is thus required to be increased to elevate the resistance value. In the exemplary embodiment, as shown in FIGS. 9A and 9B, the power supply line resistor Rg and the coupling resistor Rc are formed by the semiconductor layer 87 in the island 305. The semiconductor layer 87 is an n-type semiconductor layer, and if an AlGaAs semiconductor is used as the semiconductor layer 87, the electron mobility is high and the volume resistivity is thus low. Even when VLD1 is 5 V and Rg+Rc is 50 kΩ, the area of the resistor occupied in the setter 26 is high (about 50%, for example), and if the length of the resistor is doubled, the area of the setter 26 becomes about 1.5 times larger, which may raise the cost.

Regarding power consumption, since VLD1 is 10 V and the collector current is 0.1 mA, power consumption in the gate circuit is 1 mW (10 V*0.1 mA). By adding the power consumption (5 mW) in the thyristor, the total power consumption results in 6 mW.

To address the above-described issue, as shown in FIG. 7, the setter voltage terminal 24-3 (VGK) and the light-emitting electrode 72 (VLD) are separated from each other, so that the power consumption in the setter 26 can be maintained at a constant value regardless of VLD. Raising the base current of the transistor in the option (1-2) and increasing Rg+Rc in the approach (2) in the comparative example require optimization of parameters, such as R1, R2, Rg, and Rc, depending on the voltage VLD1. In contrast, in the exemplary embodiment, the light-emitting unit 4 is able to deal with various VLD voltages without changing the parameters.

If the voltage of the power source P2 is set to be the same as the voltage at the output level "H" of the setting driver 7, that is, the power supply voltage of the setting driver 7, the provision of another power source may be omitted.

VGK is set to be 5 V in the exemplary embodiment, but 3.3 V, which is frequently used as the rated voltage, may be used. VGK may be about 2 V if the configuration of the exemplary embodiment is employed.

First Modified Example

Figure 12A:
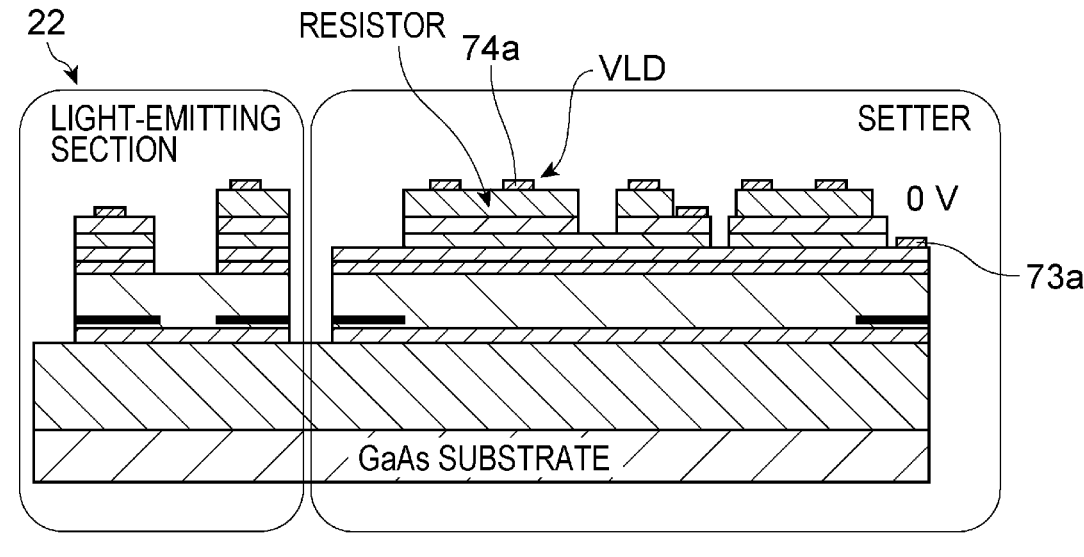
FIG. 12A illustrates the configuration similar to the exemplary embodiment shown in FIGS. 9A and 9B.
Figure 12A:
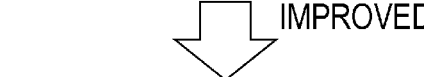
Figure 12B:
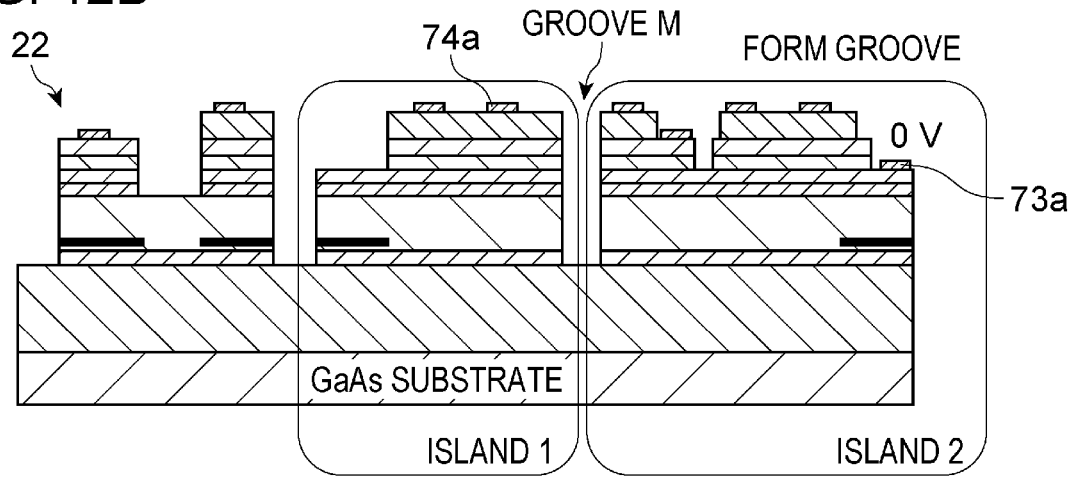
FIG. 12B illustrates the configuration according to a first modified example.
Figure 12C:
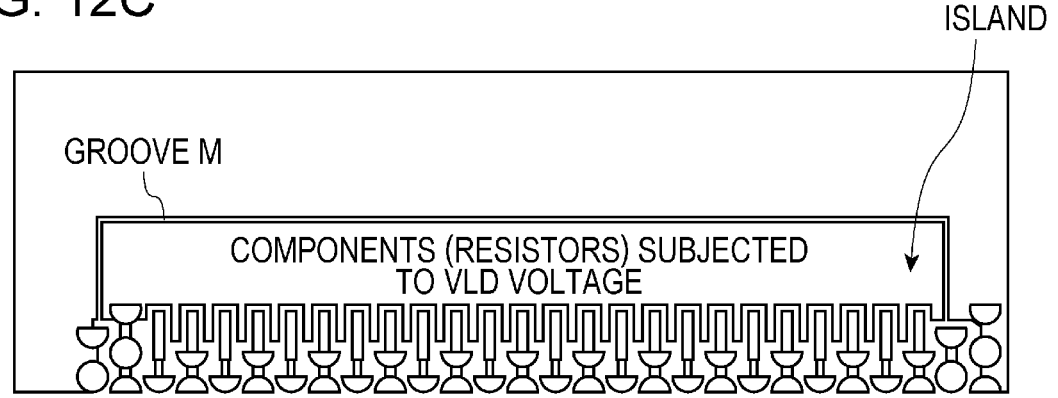
FIG. 12C is a plan view of the configuration shown in FIG. 12B.

FIG. 12A illustrates the configuration similar to the exemplary embodiment shown in FIGS. 9A and 9B. In the configuration shown in FIG. 12A, the functions are similar to those of the exemplary embodiment, but the positions of the electrodes are different from those of the exemplary embodiment. FIG. 12B illustrates the configuration according to a first modified example. FIG. 12C is a plan view of the configuration shown in FIG. 12B.

As shown in FIG. 12A, an electrode 73*a* connected to a reference potential and an electrode 74*a* connected to VLD are formed in the setter 26. Unlike the configuration in FIG. 12A, in the first modified example shown in FIG. 12B, a groove M is formed between the electrode 73*a* connected to the reference potential and the electrode 74*a* connected to VLD. The groove M is an example of an insulator in the first modified example. As another example of the insulator, insulation properties may be provided by ion implantation, instead of forming the groove M. The electrodes 73*a* and 74*a* may not necessarily be insulated from each other if a current is unlikely to flow therebetween. In the first modified example, as a result of forming the groove M, an island 1, which is an example of a first part, an island 2, which is an example of a second part, are formed and separated from each other.

In the configuration shown in FIG. 12A, under the normal conditions, the thyristor is turned ON only in response to a certain level of a signal. However, if a high voltage exceeding a withstand voltage is applied, the thyristor may be turned ON regardless of the level of a signal. In this case, a light-emitting section which is not supposed to emit light is set to a state in which it can emit light. With the groove M formed in the setter 26 shown in FIG. 12B, a portion subjected to a high voltage and a portion at a reference potential are separated from each other in the cross section and are unlikely to be connected. With this configuration, even if a high voltage exceeding a withstand voltage is applied, the shift thyristor is unlikely to operate abnormally.

As shown in the plan view of FIG. 12C, the groove M may desirably be formed to surround the island 1.

Second Modified Example

In the configuration in FIG. 4, VLD is supplied from the power supply voltage terminal 24-4, which is an example of the third terminal. Alternatively, the provision of the third terminal may be omitted, and wiring may extend from the light-emitting electrode 72, which is an example of the first terminal, to the setter 26. With this configuration, the area where the third terminal (power supply voltage terminal 24-4) is disposed may be used for another purpose, or the area of the light-emitting unit 4 may be reduced.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A light-emitting unit comprising:

a plurality of light-emitting sections;

a setter that is electrically connected to the plurality of light-emitting sections and that sets, among the plurality of light-emitting sections, a light-emitting section to a state in which the light-emitting section is able to emit light; and a first terminal that supplies a first voltage to the light-emitting section, wherein each of the plurality of light-emitting sections includes a light-emitting diode and a drive thyristor, the drive thyristor being connected in series with the light-emitting diode and driving the light-emitting diode, the setter includes a plurality of setting elements and shifts a setting element which is to be turned ON between the plurality of setting elements so as to set a corresponding drive thyristor to be an ON state, the corresponding drive thyristor being a drive thyristor included in a light-emitting section which is to emit light among the plurality of light-emitting sections, and the setter includes:

a first part that receives the first voltage, a second part that receives a reference potential, the reference potential being different from the first voltage, and an insulator interposed between the first part and the second part.

2. The light-emitting unit according to claim 1, wherein: the light-emitting diode includes a lower side layer, an active layer and an upper side layer, the drive thyristor is stacked on the light-emitting diode, the plurality of setting elements is stacked on which the lower side layer, the active layer and the upper side layer entirely remain without being removed, and the insulator is disposed on the upper side layer between the first part and the second part.

3. The light-emitting unit according to claim 2, wherein the insulator is a groove disposed between the first part and the second part.

4. The light-emitting unit according to claim 1, wherein: the light-emitting unit is constituted by laminating a plurality of semiconductor layers, and the first part and the second part are disposed at different positions in a direction perpendicular to stacking direction.

5. The light-emitting unit according to claim 1, further comprising:

a second terminal supplying, to the setter, a second voltage being lower than the first voltage and higher than the reference potential.

6. A measurement apparatus comprising:

the light source device according to claim 1; and a light receiver that receives light which is emitted from a corresponding light-emitting section of the plurality of light-emitting sections of the light source device and which is reflected by a subject to be measured.

7. A light source device comprising:

a plurality of light-emitting means;

setting means, electrically connected to the plurality of light-emitting means, for setting, among the plurality of light-emitting means, a light-emitting means to a state in which the light-emitting means is able to emit light; and means for supplying a first voltage to the light-emitting means, wherein each of the plurality of light-emitting means includes a light-emitting diode and a drive thyristor, the drive thyristor being connected in series with the light-emitting diode and driving the light-emitting diode, the setting means includes a plurality of setting elements and shifts a setting element which is to be turned ON between the plurality of setting elements so as to set a corresponding drive thyristor to be an ON state, the corresponding drive thyristor being a drive thyristor included in a light-emitting means which is to emit light among the plurality of light-emitting means, and the setting means includes:

a first part that receives the first voltage, a second part that receives a reference potential, the reference potential being different from the first voltage, and an insulating means interposed between the first part and the second part.

* * * * *